US012545318B2

United States Patent
Mueller et al.

(10) Patent No.: US 12,545,318 B2
(45) Date of Patent: Feb. 10, 2026

(54) POWER STEERING ASSEMBLY WITH TARGETED COMPENSATION OF ROADSIDE SHOCK PULSES TO THE STEERING GEAR

(71) Applicant: KNORR-BREMSE Systeme fuer Nutzfahrzeuge GmbH, Munich (DE)

(72) Inventors: Jens-Hauke Mueller, Velbert-Neviges (DE); Dimitri Epstein, Wuppertal (DE); Dirk Lettow, Wuppertal (DE); Sven Kirschbaum, Mettmann (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 546 days.

(21) Appl. No.: 18/015,362

(22) PCT Filed: Jul. 5, 2021

(86) PCT No.: PCT/EP2021/068539
§ 371 (c)(1),
(2) Date: Jan. 10, 2023

(87) PCT Pub. No.: WO2022/017765
PCT Pub. Date: Jan. 27, 2022

(65) Prior Publication Data
US 2023/0278623 A1    Sep. 7, 2023

(30) Foreign Application Priority Data
Jul. 24, 2020 (DE) .................... 10 2020 119 608.3

(51) Int. Cl.
*B62D 5/12*  (2006.01)
*B62D 5/24*  (2006.01)
(Continued)

(52) U.S. Cl.
CPC .............. *B62D 5/12* (2013.01); *B62D 5/24* (2013.01); *B62D 7/20* (2013.01); *B62D 7/224* (2013.01); *B62D 7/226* (2013.01); *B62D 7/228* (2013.01)

(58) Field of Classification Search
CPC ... B62D 5/12; B62D 5/24; B62D 7/20; B62D 7/224; B62D 7/226; B62D 7/228; B62D 7/22; B62D 3/08
See application file for complete search history.

(56) References Cited

U.S. PATENT DOCUMENTS

| 2,144,489 A | 1/1939 | Gieskieng |
| 2,227,521 A | 1/1941 | Utz |

(Continued)

FOREIGN PATENT DOCUMENTS

| CN | 107921993 A | 4/2018 |
| CN | 108349523 A | 7/2018 |

(Continued)

OTHER PUBLICATIONS

Japanese-language Office Action issued in Japanese Application No. 2023-504561 dated Dec. 5, 2023 with English translation (10 pages).

(Continued)

*Primary Examiner* — Drew J Brown
(74) *Attorney, Agent, or Firm* — Crowell & Moring LLP

(57) ABSTRACT

A power steering assembly for an electro-mechanical power steering system of motor vehicles, in particular utility vehicles, includes a steering gear. The steering gear is designed to transmit a rotational movement introduced by a steering element, in particular by a steering wheel, via an input side of the steering gear, in particular via an input shaft of the steering gear, to an output side of the steering gear. The power steering assembly is designed to convert a (Continued)

movement derived from the output side of the steering gear into a rotational movement of at least one wheel of the motor vehicle about a steering axis. The power steering assembly is characterized in that the power steering assembly has an absorption unit for at least partial absorption of roadside shocks from the wheel of the motor vehicle.

15 Claims, 11 Drawing Sheets

(51) Int. Cl.
 *B62D 7/20* (2006.01)
 *B62D 7/22* (2006.01)

(56) References Cited

U.S. PATENT DOCUMENTS

| | | |
|---|---|---|
| 3,896,702 A | 7/1975 | Shah et al. |
| 4,092,078 A | 5/1978 | Klotz et al. |
| 5,704,726 A | 1/1998 | Nemoto |
| 6,773,197 B2 | 8/2004 | Urbach |
| 2004/0071501 A1 | 4/2004 | Ureach |
| 2005/0191120 A1 | 9/2005 | Oellers |
| 2006/0108760 A1 | 5/2006 | Vandaele |
| 2008/0230301 A1 | 9/2008 | Roell |
| 2016/0053841 A1 | 2/2016 | Figura et al. |
| 2018/0244303 A1 | 8/2018 | Wilske et al. |
| 2019/0061812 A1 | 2/2019 | Hecker et al. |
| 2020/0140010 A1 | 5/2020 | Ross |

FOREIGN PATENT DOCUMENTS

| | | | | |
|---|---|---|---|---|
| CN | 118003818 A | * | 5/2024 | ........... B60K 7/0007 |
| DE | 956199 C | | 1/1957 | |
| DE | 24 35 518 A1 | | 2/1975 | |
| DE | 26 55 353 | | 6/1978 | |
| DE | 196 23 630 A1 | | 7/1997 | |
| DE | 196 20 975 A1 | | 11/1997 | |
| DE | 197 52 075 A1 | | 5/1999 | |
| DE | 10 2005 007 613 A1 | | 9/2005 | |
| DE | 10 2005 005 591 A1 | | 6/2006 | |
| DE | 20 2014 103 932 U1 | | 10/2014 | |
| DE | 10 2014 216 445 A1 | | 2/2016 | |
| DE | 10 2014 216 670 A1 | | 2/2016 | |
| DE | 10 2017 010 530 A1 | | 5/2018 | |
| EP | 1 032 522 B1 | | 10/2002 | |
| JP | 55-59068 A | | 5/1980 | |
| JP | 2007-302110 A | | 11/2007 | |
| JP | 2012-144108 A | | 8/2012 | |
| JP | 2019-38383 A | | 3/2019 | |
| KR | 1998-028532 U | | 8/1998 | |
| KR | 1998-031415 U | | 8/1998 | |
| KR | 1020020034359 A | | 5/2002 | |
| KR | 10-2011-0073001 A | | 6/2011 | |
| WO | WO-2025097799 A1 | * | 5/2025 | ........... B60K 7/0007 |

OTHER PUBLICATIONS

International Search Report (PCT/ISA/210) issued in PCT Application No. PCT/EP2021/068539 dated Oct. 18, 2021 with English translation (six (6) pages).

German-language Written Opinion (PCT/ISA/237) issued in PCT Application No. PCT/EP2021/068539 dated Oct. 18, 2021 (nine (9) pages).

German-language Office Action issued in German Application No. 10 2020 119 608.3 dated Jul. 15, 2021 (12 pages).

German-language Office Action issued in German Application No. 10 2020 119 608.3 dated Nov. 18, 2022 (12 pages).

Chinese-language Office Action issued in Chinese Application No. 202180059745.3 dated Feb. 27, 2025 with English translation (13 pages).

* cited by examiner a)

b)

a)

b)

a)

b) B-B a)

b) A-A a)

b)

c)

POWER STEERING ASSEMBLY WITH TARGETED COMPENSATION OF ROADSIDE SHOCK PULSES TO THE STEERING GEAR

BACKGROUND AND SUMMARY

The present invention relates to a power steering subassembly for an electromechanical power steering system of motor vehicles.

A large number of power steering subassemblies are known from the prior art. In this case, power steering subassemblies particularly comprise with regard to the steering gear which is installed in the power steering subassembly a plurality of components which are sensitive to mechanical loads. Thus, for example, the steering gear generally has a spindle and a recirculating ball nut with balls or a ball chain and furthermore tooth arrangement pairs, for instance in the form of an external tooth arrangement of the recirculating ball nut which engages in a segment tooth arrangement of a segmented shaft. These components are particularly sensitive to abruptly introduced, mechanical forces or loads.

A source of such abruptly introduced loads involves, for example, shock pulses from the road. Thus, for example, occurrences of unevenness in the road can lead to shocks in the motor vehicle which can lead, for example, to undesirable abrupt movements in a power steering subassembly. In order to compensate for shocks from the road, in the prior art only the shock absorber system of the wheel suspension is usually responsible. However, such a system is in need of improvement in that loads or stresses which are introduced into sensitive components of a steering gear could be compensated for or absorbed in an even more selective manner.

This problem is set out below using the example of a utility vehicle, wherein this is not intended to be understood in a limiting manner for the present invention. Utility vehicles generally have power steering subassemblies having a recirculating ball steering system. To this end, the power steering subassembly has a steering gear which is configured to transmit a rotational movement which is introduced from a steering transmitter, that is to say, for example, from a steering wheel, via an input side of the steering gear to an output side of the steering gear. In this case, the input side may, for example, be formed by an input shaft and the output side may be formed by an output shaft, for example, in the form of a segmented shaft. Inside the steering gear, the introduced rotational movement of the input shaft can then be converted according to specifications, for example, in that the input shaft is in the form of a spindle and, as a result of the rotational movement thereof, provides a translational movement of a recirculating ball nut which engages around the spindle portion, wherein this translational movement can also be referred to as an axial movement of the recirculating ball nut or of the piston. The recirculating ball nut is in turn generally provided with an external tooth arrangement. The recirculating ball nut can subsequently ensure, with the external tooth arrangement which is in meshing engagement with a segment tooth arrangement of the segmented shaft, that the translational movement of the recirculating ball nut is converted into a rotational movement of the segmented shaft or output shaft and consequently output at the output side of the steering gear. A steering lever is usually provided in abutment with this output side and a thrust rod is provided in a state connected thereto in an articulated manner. The thrust rod of the power steering subassembly finally takes up the rotational movement which is output from the output side of the steering gear and carries out itself a translational thrust rod movement—also referred to as an axial movement—according to specifications in the event of a steering operation. In this case, this translational thrust rod movement brings about a rotational movement according to specifications of at least one wheel of the motor vehicle about a steering axle.

In power steering subassemblies which are constructed in this manner, shock pulses from the road can lead, in many of the mentioned components of the power steering subassembly, to abrupt movements which in turn lead to undesirable loads or stresses which are introduced into the interior of the steering gear. Such forces or loads and stresses are currently mainly compensated for in the power steering subassemblies themselves of the prior art generally by the hydraulic unit of the power steering subassemblies.

Against this background, an object of the invention is to develop a power steering subassembly of the type mentioned in the introduction in that the steering gear is better protected from shock pulses from the road.

This object is achieved by a power steering subassembly having the features of the independent claim. The dependent patent claims disclose additional, particularly advantageous embodiments of the invention.

It should be noted that the features which are set out individually in the patent claims can be combined with each other in any technically advantageous manner and set out additional embodiments of the invention. The description additionally characterizes and specifies the invention particularly in connection with the Figures.

According to the invention a power steering subassembly is proposed for an electromechanical power steering system of motor vehicles, in particular utility vehicles. The power steering subassembly has a steering gear. The steering gear is configured to transmit a rotational movement which is introduced from a steering transmitter, in particular from a steering wheel, via an input side of the steering gear, in particular via an input shaft of the steering gear, to an output side of the steering gear. In this case, the power steering subassembly is configured to convert a movement which is output from the output side of the steering gear into a rotational movement of at least one wheel of the motor vehicle about a steering axle. The power steering subassembly is characterized in that it has an absorption unit for at least partially absorbing shocks which are received via the wheel of the motor vehicle from the road.

The significant aspect is the fundamental consideration of configuring the power steering subassembly so that, in the context of the power steering subassembly, an individual absorption unit is provided according to specifications for selectively protecting the steering gear from loads or stresses which result from shock pulses from the road. To this end, the absorption unit selectively compensates for such movements and the resultant loads by kinetic energy being selectively converted into potential energy in the absorption unit. Forces or loads in the steering gear which would substantially not be damped or dissipated without the presence of the absorption unit according to the proposal or would be damped or compensated for simply by the hydraulic unit of the power steering system are reduced. To this end, the absorption unit is configured to convert kinetic energy into potential energy and ensures that vibrations are selectively damped or absorbed. Preferably, the absorption unit is constructed in a resilient manner to this end. The absorption unit is advantageously configured in such a manner that at least small relative movements of the adjacent components, which abut the absorption unit, of the power steering subassembly are permitted.

The absorption unit according to the proposal is individually integrated in the power steering subassembly in this case and is a component thereof. To this end, the absorption unit can be integrated, on the one hand, in the conversion train of the steering movement of the entire arrangement, that is to say, from the steering transmitter, that is, for example, the steering wheel, when viewed in the direction of the wheel which is intended to be steered, between the input side of the steering gear and the thrust rod which ensures, for example, the steering. On the other hand, for example, the absorption unit can also be integrated in the fixing arrangement of the steering gear with respect to the frame of the motor vehicle.

As a result, abrupt movements in the power steering subassembly according to the proposal are advantageously selectively compensated for by the absorption unit and the resultant loads are at least partially absorbed. In this manner, the shock pulses can be selectively damped or compensated for if they or the resultant forces are transmitted from the road either via the wheel, for example, to a thrust rod and where applicable to the additional components which adjoin the, for example, thrust rod provided, of the power steering subassembly or also via the housing of the steering gear. In this manner, the hydraulic unit of the power steering subassembly is no longer solely responsible for such compensation of the shock pulses from the road and consequently the steering gear of the power steering subassembly according to the proposal and in particular the sensitive components which are arranged inside the steering gear is/are better protected from shock pulses from the road.

Preferably, the input side of the steering gear can be formed by an input shaft, wherein the input shaft can be particularly in the form of a spindle. The output side of the steering gear can again be formed usually by an output shaft, preferably by a segmented shaft. The movement which is output from the output side of the steering gear can be transmitted directly or indirectly from the output side, for example, via the segmented shaft, to, for example, a thrust rod. Thus, for example, the output shaft can be connected to a steering lever securely, in particular in a rotationally fixed manner or rotationally secure manner. The steering lever can then take up a rotational movement of the output shaft and also carry out a rotational movement. Subsequently, for example, a ball joint which connects the steering lever to the thrust rod can be provided at the end, facing away from the output shaft, of the steering lever. The ball joint can accordingly ensure that the movement which is output from the output side of the steering gear is transmitted in the form of the rotational movement of the output shaft and consequently of the rotational movement of the steering lever to the thrust rod in order to carry out a translational thrust rod movement.

In such an embodiment with a thrust rod, the thrust rod is accordingly provided to receive the movement which is output from the output side of the steering gear and to carry out a translational thrust rod movement, wherein the thrust rod is arranged in such a manner that the translational thrust rod movement brings about the rotational movement of the at least one wheel of the motor vehicle about the steering axle.

The absorption unit can, for example, advantageously be arranged in such a manner that it is arranged between the output side, in particular the output shaft, of the steering gear and the wheel, preferably between the output side, in particular the output shaft, of the steering gear and the thrust rod.

Furthermore, the absorption unit can advantageously be arranged in such a manner that it is integrated in the steering gear and is preferably arranged between the input side and the output side of the steering gear.

Furthermore, the absorption unit can advantageously be integrated in the fixing arrangement of the steering gear with respect to a frame of the motor vehicle.

According to a preferred embodiment of the power steering subassembly according to the proposal, there is provision for at least one ball joint to be arranged adjacent to the output side of the steering gear, in particular between the output side of the steering gear and the thrust rod, in order to transmit the movement which is output from the output side of the steering gear, in particular to the thrust rod, for carrying out the translational thrust rod movement, and for the absorption unit to be at least partially integrated in the ball joint, and preferably at least partially formed by a resilient element which is arranged under a bearing shell of the ball joint, in particular elastomer material. Advantageously, consequently, shock pulses from the road are selectively absorbed in the ball joint by the absorption unit or the elastomer material and are consequently no longer introduced into the steering gear in a substantially non-damped manner or without compensation. It has surprisingly been recognized by the present invention that the additional construction complexity of the proposed configuration of the ball joint of the power steering subassembly and furthermore an actual weakening, which is associated as a result of the increased complexity of the component in the form of the ball joint, of the system are nevertheless worthwhile because the durability of the entire power steering subassembly can be increased. Thus, precisely the components of the steering gear which are sensitive to mechanical loads are advantageously selectively protected from shock pulses from the road. The bearing shell is particularly configured to receive a ball of the ball joint. According to this embodiment, the absorption unit is at least partially integrated in the ball joint, in the same manner as the elastomer material preferably at least partially forms the absorption unit according to the proposal. The wording "at least partially" is intended in this instance to be understood to mean that an absorption unit according to the proposal may also include a plurality of components which ensure in cooperation with each other that shocks from the road are compensated for. In the present embodiment, however, at least the absorption unit which is integrated in the ball joint and is formed by the resilient element, in particular in the form of the elastomer material, is responsible for the advantageous compensation. This power steering subassembly according to the proposal can be further supplemented by the additional absorption units which are set out below. The wording "at least partially" is also intended to be understood in this sense in the additional embodiments.

According to an additional preferred embodiment of the power steering subassembly according to the proposal, there is provision for the absorption unit to be at least partially integrated in the thrust rod and preferably to be formed at least partially by a resilient element, which is arranged between two portions of the thrust rod, in particular an elastomer material or spring assembly, more preferably for a thrust rod sleeve to be provided, wherein the thrust rod sleeve is preferably arranged in such a manner that the thrust rod sleeve at least partially externally surrounds the two portions of the thrust rod and the resilient element which is arranged between the two portions of the thrust rod, in particular elastomer material or spring assembly. In particular, the thrust rod can be configured so as to be divided in two, preferably divided into two substantially identical portions. It has surprisingly been recognized by the present invention that, in spite of the additional construction complexity in the form of dividing the thrust rod into portions and particularly in spite of the corresponding actual weakening of the thrust rod and the entire power steering subassembly, nevertheless the durability of the entire power steering subassembly can be increased. This is because precisely components, which are sensitive to mechanical loads, of the steering gear are advantageously selectively protected from shock pulses from the road by compensation in the absorption unit.

Alternatively or additionally, there may further advantageously be provision for the absorption unit to be at least partially integrated in a fixing arrangement in order to fix the steering gear to a frame of the motor vehicle, and preferably to be formed at least partially by at least one resilient element, in particular an elastomer material, wherein the at least one resilient element, in particular elastomer material, is further preferably at least partially arranged between a head of a fixing screw, which fixes the steering gear to a beam, in particular to a longitudinal beam, of the frame of the motor vehicle, and an assembly side of the steering gear in such a manner that the at least one resilient element, in particular elastomer material, is pressed together in an assembled state by screwing in the fixing screw. It has surprisingly been recognized by the present invention that, in spite of the additional construction complexity in the form of supplementing the fixing arrangement with an absorption unit or individual elastomer materials, nevertheless the efficiency of the entire power steering subassembly can be increased. This is because precisely those components, which are sensitive to mechanical loads, of the steering gear are advantageously selectively protected from shock pulses from the road and consequently the durability of the power steering subassembly is increased.

Additionally, there may be advantageously be provision for a spacer sleeve to be provided, wherein the spacer sleeve is arranged between an assembly side of the steering gear and the beam, in particular the longitudinal beam, of the frame of the motor vehicle, wherein the resilient element, in particular elastomer material, which forms the absorption unit which is integrated in the fixing arrangement externally surrounds the spacer sleeve, wherein the spacer sleeve externally surrounds a shaft of the fixing screw. In this manner, the assembly of the steering gear and consequently of the entire power steering subassembly can advantageously be simplified.

According to another preferred embodiment of the power steering subassembly according to the proposal, there is provision for a steering lever which adjoins the output side of the steering gear and which connects in particular the output side of the steering gear to the thrust rod to be provided and for the absorption unit to be at least partially integrated in a transition from the steering lever to an adjacent ball joint which is particularly connected to the thrust rod. It has surprisingly been recognized by the present invention that, in spite of the additional construction complexity in the form of modifying the connection of the steering lever to the ball joint or, for instance, to an adjoining thrust rod and particularly in spite of the corresponding actual weakening of the articulated connection and the entire power steering subassembly, nevertheless the durability of the entire power steering subassembly can be increased. This is because precisely sensitive components of the steering gear are advantageously selectively protected from shock pulses from the road.

Additionally, there may advantageously be provision for the absorption unit which is integrated in the transition from the steering lever to the ball joint to be formed by a resilient element, in particular by an elastomer material, wherein the resilient element is arranged at an end, facing the ball joint and in particular the thrust rod, of the steering lever in such a manner that the resilient element forms an at least positive-locking connection with respect to the ball joint which preferably connects the steering lever to the thrust rod in an articulated manner. In this manner, abrupt movements can be compensated for particularly effectively.

Additionally, there may advantageously be provision for the resilient element to be arranged at the end, facing the thrust rod, of the steering lever in a front, central receiving member, with respect to a steering lever axis, of the steering lever and so as to externally surround a connection piece of the ball joint which connects the steering lever to the thrust rod. Shock pulses from the road can consequently be compensated for particularly effectively before they are introduced into the steering gear.

According to another preferred embodiment of the power steering subassembly according to the proposal, there is provision for the output side of the steering gear to be at least partially formed by an output shaft, in particular by a segmented shaft, and for the absorption unit to be at least partially integrated in the output shaft, more preferably for the absorption unit to be at least partially formed by a torsion spring which is arranged between an inner portion and an output portion of the output shaft, more preferably for the torsion spring to be arranged in such a manner that the torsion spring connects the inner portion and the output portion of the output shaft to each other in a positive-locking and/or non-positive-locking manner and a rotational movement of the inner portion of the output shaft is transmitted via the torsion spring to the output portion of the output shaft and vice versa. It has surprisingly been recognized by the present invention that, in spite of the additional construction complexity in the form of dividing the output shaft of the steering gear into two portions and particularly in spite of the corresponding actual weakening of the output shaft and consequently of the entire power steering subassembly, nevertheless the durability of the entire power steering subassembly can be increased. This is because precisely sensitive components of the steering gear are advantageously selectively protected from shock pulses from the road.

Alternatively or additionally, there may further advantageously be provision for the steering gear to have an input shaft in the form of a spindle and a recirculating ball nut in order to convert the rotational movement of the input shaft into a translational movement, wherein a tooth arrangement portion is provided so as to externally surround the recirculating ball nut, and for the absorption unit to be arranged in such a manner that the translational movement of the recirculating ball nut is transmitted via the absorption unit to the tooth arrangement portion and vice versa, more preferably for the absorption unit to be formed from at least one resilient element, in particular from at least one disk spring and/or at least one helical spring and/or at least one elastomer material. In this manner, shock pulses from the road can be effectively compensated for particularly advantageously in the steering gear itself.

According to another preferred embodiment of the power steering subassembly according to the proposal, there is provision for the steering gear to be in the form of a recirculating ball steering system and for the absorption unit to be at least partially integrated in a hydraulic unit of the recirculating ball steering system, wherein the hydraulic unit of the recirculating ball steering system has two oil chambers, which are arranged at opposite sides of a piston and which are separated from each other, for hydraulic steering support, and wherein the absorption unit which is integrated in the hydraulic unit of the recirculating ball steering system is formed by a compensation element, which connects the two oil chambers to each other, preferably by a valve or by an aperture. In this manner, shock pulses from the road can be effectively compensated for particularly advantageously in the steering gear itself.

Alternatively or additionally, there may further advantageously be provision for the steering gear to have an input shaft in the form of a spindle and a recirculating ball nut for converting the rotational movement of the input shaft into a translational movement, and for the absorption unit to be at least partially formed as an axial resilient spindle bearing of the input shaft. In this manner, shock pulses from the road can be effectively compensated for particularly advantageously at the input side of the steering gear.

Additionally, there may advantageously be provision for the absorption unit which is formed as an axial resilient spindle bearing of the input shaft to be formed by at least one resilient element, in particular by at least one disk spring, wherein the at least one resilient element is arranged in a manner adjoining a bearing arrangement of the input shaft for rotatably supporting the input shaft in a housing in such a manner that the bearing arrangement of the input shaft is received in the housing in an axially resilient manner via the at least one resilient element. The term "in an axially resilient manner" is particularly intended to be understood to mean axially with respect to the input shaft. It has surprisingly been recognized by the present invention that, in spite of the additional construction complexity in the form of supplementing the bearing arrangement of the input shaft, nevertheless the efficiency of the entire power steering subassembly can be increased. This is because precisely sensitive components of the steering gear are advantageously selectively protected from shock pulses from the road and the durability is consequently increased.

Alternatively, there may advantageously be provision for the input shaft, which is in the form of a spindle, to be constructed in several pieces by at least one spindle portion, which faces the recirculating ball nut, and an input portion, and for the spindle portion and the input portion to be connected to each other in a rotationally secure but axially resilient manner via the absorption unit, which is in the form of an axial, resilient spindle bearing of the input shaft, preferably in the form of at least one resilient element, particularly preferably in the form of annular springs. It has surprisingly been recognized by the present invention that, in spite of the additional construction complexity in the form of dividing the input shaft and particularly in spite of the corresponding actual weakening of the input shaft and consequently of the entire power steering subassembly, nevertheless the durability of the entire power steering subassembly can be increased. This is because precisely sensitive components of the steering gear are advantageously selectively protected from shock pulses from the road.

Additional features and advantages of the invention will be appreciated from the claims and the following description of embodiments, which are not intended to be understood in a limiting manner, of the invention which is explained in greater detail below with reference to the drawings.

DETAILED DESCRIPTION OF THE DRAWINGS

Figure 1:
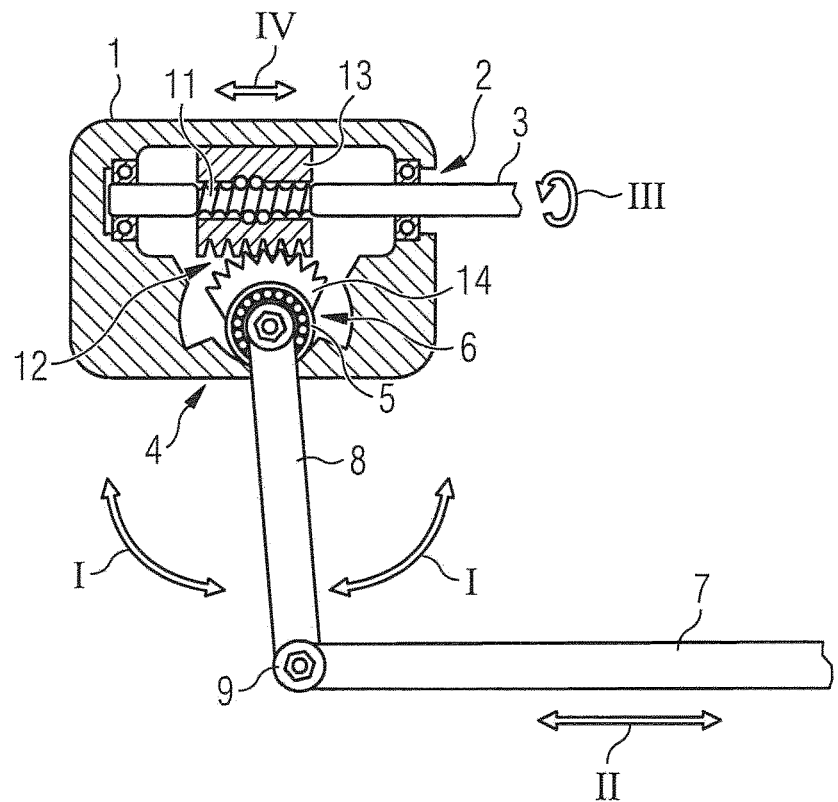
FIG. 1 shows a schematic illustration of a steering gear.

FIG. 1 schematically illustrates a power steering subassembly for an electromechanical power steering system of motor vehicles. The power steering subassembly has a steering gear 1. Via the steering gear 1, a steering movement which is carried out by a steering transmitter, which is not illustrated in FIG. 1, such as, for example, a steering wheel, by the driver of the motor vehicle is converted. To this end, a rotational movement which is initiated via an input side 2 of the steering gear 1, in the specifically illustrated case via an input shaft 3, is transmitted to an output side 4 of the steering gear 1.

At the output side 4 of the steering gear 1, in turn a movement, in the specifically illustrated case a rotational movement, of an output shaft 6, which is in the form of a segmented shaft 5, of the steering gear 1 is output. This movement, which is output at the output side 4, is a rotational movement in the currently illustrated case and is indicated by two curved double-headed arrows I, is ultimately received by a thrust rod 7 of the power steering subassembly in the currently illustrated, non-limiting embodiment, wherein the thrust rod 7 thereby carries out a translational thrust rod movement. The translational thrust rod movement of the thrust rod 7 is a linear movement which is indicated in FIG. 1 by a double-headed arrow II, and finally results in at least one wheel of the motor vehicle turning about a steering axle (not illustrated in FIG. 1) so that as a result the motor vehicle carries out desired travel round a bend.

In order to convert the rotational movement output at the output side 4 (double-headed arrows I) into the desired translational thrust rod movement (double-headed arrow II) of the thrust rod 4, the illustrated power steering subassembly has a steering lever 8 and a joint, which connects the steering lever 8 to the thrust rod 7, in the form of a ball joint 9.

In order to describe a conventional steering operation, reference is made below both to FIG. 1 and to FIG. 2 which shows a schematic illustration of a motor vehicle 10 from below with a power steering subassembly with the steering gear 1 from FIG. 1.

For motor vehicles 10 in the form of utility vehicles, generally recirculating ball steering gears are used as so-called recirculating ball steering systems (RBS for short). The kinematics of such an arrangement is particularly favorable for utility vehicles because they usually have a front axle in the form of a rigid axle. If the longitudinal links of the front axle and the thrust rod are approximately of the same length and arranged substantially parallel with each other, they form a parallelogram. Deflection movements of the front axle thereby have no or little effect. If the steering gear 1 is fitted in a manner secured to the frame, a length compensation can be carried out in the steering column, for example, as a result of a corresponding relative movement between a frame of the motor vehicle 10 and a driver's cab. Since, in utility vehicles, this involves an application for which the power steering subassembly according to the proposal is particularly suitable, the invention is explained below using the example of a recirculating ball steering system.

The steering gear 1 comprises an input shaft 3 which is partially in the form of a spindle 11 and a recirculating ball nut 13 which is arranged in the region of the spindle 11 and which has an external tooth arrangement 12. A segment tooth arrangement 14 is in engagement with the external tooth arrangement 12. The segment tooth arrangement 14 and the external tooth arrangement 12 are arranged so as to mesh with each other. The segment tooth arrangement 14 is further connected in a rotationally secure manner, that is to say, without mutual rotation, to the output shaft 6 which is accordingly in the form of a segmented shaft 5. The steering lever 8 is in turn connected in a rotationally secure manner or without mutual rotation to the output shaft 6, wherein the steering lever 8 is again, as already described above, movably connected to the thrust rod 7 via the ball joint 9.

In the steering gear 1, the rotation of a steering transmitter, specifically a steering wheel 15 (FIG. 2), is transmitted via the steering column and the input shaft 3 which may be, for example, part of the steering column, to the spindle 11 which is also referred to as a recirculating ball spindle or where applicable worm. This rotational movement which is denoted in FIG. 1 by an arrow III which indicates a circular movement, is converted by means of the recirculating ball nut 13 into a linear movement of the recirculating ball nut 13 and consequently also of the external tooth arrangement 12 of the recirculating ball nut 13, denoted in FIG. 1 by a double-headed arrow IV.

Subsequently, the linear movement which is denoted by the double-headed arrow IV is converted into the already-described rotational movement of the output shaft 6, which rotational movement is output at the output side 4 of the steering gear 1 and is denoted by the curved double-headed arrows I, via the tooth arrangement pairing of the external tooth arrangement 12 and the segment tooth arrangement 14. Consequently, the linear movement (double-headed arrow IV) is ultimately also converted into the rotational movement (double-headed arrow I) of the steering lever 8. At the end of the steering lever 8, the thrust rod 7 is again moved mainly linearly. As a result of the thrust rod 7, as can be seen in FIG. 2, the wheel 17 which is intended to be steered is pivoted about the steering axle 18 via a steering lever 16 fixed to the wheel carrier, which is indicated by a curved double-headed arrow V in FIG. 2. In this case, an additional wheel 19 which is opposite the wheel 17 can also be steered via a track lever 20 and a rigid track rod 21.

Figure 2:
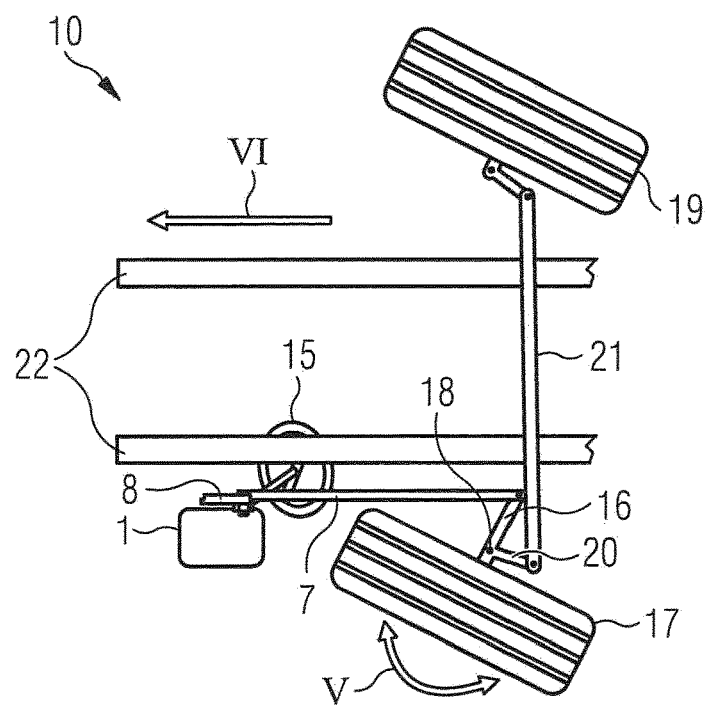
FIG. 2 shows a schematic illustration of a motor vehicle with a steering gear. from FIG. 1.

FIG. 2 further illustrates a frame 22 of the motor vehicle 10 in the form of two longitudinal beams which are arranged parallel with each other. The steering gear 1 can be assembled on the frame 22 of the motor vehicle 10 by means of a fixing arrangement which is not illustrated in FIGS. 1 and 2 by, for example, longitudinal beams of the frame 22 and housing of the steering gear 1 being connected to each other via fixing screws. A travel direction of the motor vehicle 10 is denoted in FIG. 2 with an arrow VI.

The steering gear 1 preferably has a hydraulic servo support. To this end, the recirculating ball nut 13 is sealed against a housing of the steering gear 1. The recirculating ball nut 13 can consequently act as a so-called hydraulic piston, also simply known as a piston. The recirculating ball steering system accordingly has two oil chambers which are separated from each other at opposite sides of the piston for hydraulic steering support. Via the steering torque which is introduced by the driver at the input shaft 3, a differential pressure between the two sides of the recirculating ball nut 13 can subsequently be built up, for instance, by means of a rotary disk valve. The movement of the recirculating ball nut 13 can be supported by the differential pressure.

The described power steering subassembly has a plurality of components which are sensitive to mechanical loads in order to achieve the desired steering movement, in particular in the steering gear 1. It is necessary to protect these components particularly from abrupt movements which can result, for example, from the fact that vibrations and ultimately undesirable forces are introduced via the wheels 17, 19 as far as the steering gear 1. Such forces or loads or stresses in the system can occur if, for example, occurrences of road unevenness lead to shocks which are introduced via the wheels 17, 19. In this regard, it is particularly desirable to damp or to compensate for such shock pulses from the road in the direction toward the steering gear 1 and consequently to prevent damage to components of the steering gear 1. In particular, such damaging shocks in the illustrated embodiment can be transmitted via the wheels 17, 19 and subsequently the thrust rod 7 onward as far as the steering gear 1, whereby damage to sensitive components of the steering gear 1 could be caused.

In this case, the present invention advantageously provides a solution. To this end, a significant aspect is that the power steering subassembly has an absorption unit 23 for absorbing shocks which result from the road and which are received via the wheel 17, 19 of the motor vehicle 10.

In this case, the absorption unit 23 can be provided at extremely different locations or node points of the power steering subassembly. The absorption unit 23 is preferably formed by at least one energy-absorbing element and is configured to at least partially convert kinetic energy into potential energy. To this end, the absorption unit 23 is preferably integrated in the power steering subassembly in such a manner that components, which adjoin the absorption unit 23, of the power steering subassembly can carry out at least minimal movements relative to each other. To this end, the absorption unit 23 is preferably constructed in a resilient manner or has an increased flexibility in comparison with the adjoining components. In this manner, abrupt movements can be selectively received in the absorption unit 23 by components in the power steering subassembly and damped or compensated for thereby. The relative movements which are selectively permitted in the component, the absorption unit 23, ensure a selective energy conversion and consequently a compensation for the kinetic energy. In this manner, the risk of damage to components which are sensitive to mechanical loads in the steering gear 1 is substantially reduced.

Figure 3:
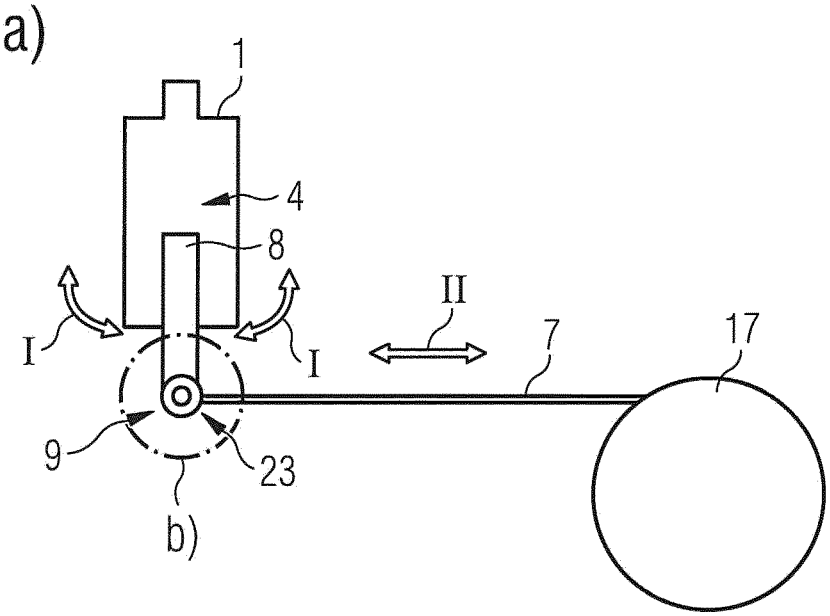
FIG. 3 partially shows an additional power steering subassembly according to the proposal, in FIG. 3a) as a schematic view and in FIG. 3b) with an absorption unit according to the proposal in detail as a schematic illustration.
Figure 3:
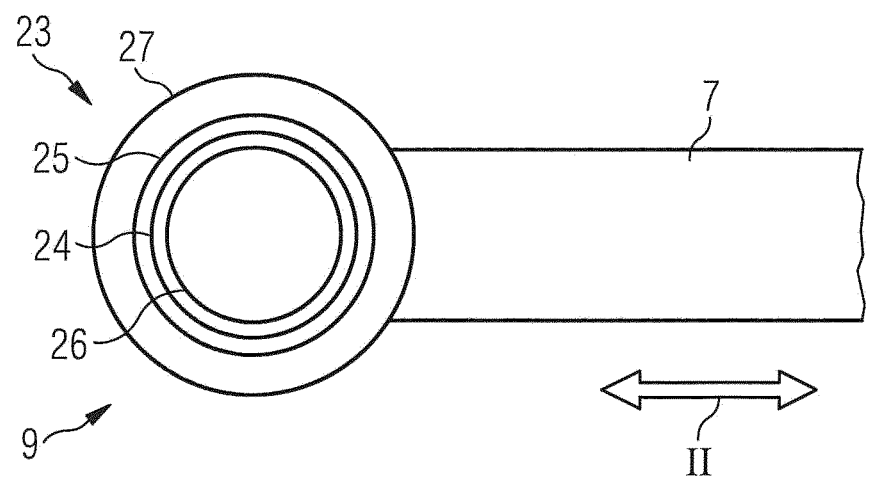

A variant of an absorption unit 23 according to the proposal for absorbing or compensating for shocks which result from the road and which are received via the wheel 17, 19 of the motor vehicle 10 is illustrated in FIG. 3. In this case, FIG. 3a) schematically shows the steering gear 1, at the output side 4 of which the steering lever 8 receives the rotational movement (double-headed arrow I) which is output from the output side 4 of the steering gear 1, and this rotational movement is then transmitted via the ball joint 9 to the thrust rod 7 in such a manner that the thrust rod 7 carries out the translational thrust rod movement (double-headed arrow II) in order to carry out the steering movement of the wheel 17 according to specifications.

In order to selectively compensate for shocks which are from the road and which are received via the wheel 17, the absorption unit 23 according to the illustrated embodiment is at least partially integrated in the ball joint 9, as shown in FIG. 3b), in which in particular the ball joint 9 from FIG. 3a) is illustrated as a detailed view to a greater scale. To this end, a resilient element, which is arranged under a bearing shell 24 of the ball joint 9, in the form of the elastomer material 25 is provided and at least partially forms the absorption unit 23 according to the proposal.

The bearing shell 24 of the ball joint 9 receives the ball 26 of the ball joint 9. The absorption unit 23 in the form of the elastomer material 25 in FIG. 3b) is arranged under the bearing shell 24 and accordingly at the side, facing away from the ball 26 of the ball joint 9, of the bearing shell 24. In this case, the elastomer material 25 preferably substantially surrounds the external circumference of the bearing shell 24. At the outer side, an outer shell 27 at least partially surrounds the elastomer material 25 of the ball joint 9.

In the embodiment illustrated here, the absorption unit 23 is at least partially integrated in the ball joint 9 in the same manner as the elastomer material 25 at least partially forms the absorption unit 23 according to the proposal. The wording "at least partially" is intended to be understood here to mean that an absorption unit 23 according to the proposal may also include a plurality of components which ensure, with cooperation with each other, that shocks from the road are damped or the resultant loads or stresses are compensated for in the power steering subassembly. In the present embodiment, however, at least the absorption unit 23 which is integrated in the ball joint 9 and which is formed by the elastomer material 25 is responsible for the advantageous compensation. This power steering subassembly according to the proposal can further be supplemented by the additional absorption units 23 which are illustrated below. In this context, the wording is also intended to be at least partially understood in the additional embodiments.

In the embodiment illustrated in FIG. 3, the shocks which are from the road and which are received via the wheel 17 and finally transmitted via the thrust rod 7 are advantageously compensated for, before they are introduced into the steering gear 1, by the absorption unit 23 according to the proposal in that the resilient element in the form of the elastomer material 24 at least partially absorbs the shocks.

Alternatively or additionally, however, it is also contemplated for the absorption unit not to be formed by a resilient element in the form of an elastomer material 24 but instead for a material other than a resilient element to be used as an absorption unit 23. Thus, it is also conceivable for metal materials with a selectively adjusted, more powerful flexibility than the components of the power steering subassembly surrounding them to be used and, in this manner, the loads or stresses which are introduced via shocks from the road into the power steering subassembly to be selectively compensated for by the conversion of kinetic energy into potential energy in such an absorption unit 23 before relatively great damage can occur in the steering gear 1.

Abrupt thrust rod movements can consequently be compensated for or at least partially absorbed by means of the currently illustrated absorption unit 23 according to the proposal by the elastomer material 25. Accordingly, damage to components which are sensitive to mechanical loads, such as tooth arrangements and recirculating ball spindles, in particular in the sensitive steering gear 1, can advantageously be prevented in the power steering subassembly according to the proposal.

In the embodiment illustrated, the elastomer material 25 allows the adjacent components of the power steering subassembly in the form of the ball 26 or also the bearing shell 24 and the thrust rod 7 which is connected thereto and in the form of the outer shell 27, to which the steering lever 8 can again be connected, to be able to selectively carry out at least small relative movements relative to each other. As a result of such relative movements, kinetic energy which is introduced into the system from undesirable, abrupt shocks from the road can selectively be converted into potential energy in the absorption unit 23 according to specifications. Less kinetic energy is thereby introduced into the center of the power steering subassembly, that is to say, the interior of the steering gear 1, and better protection of the components which are sensitive to mechanical loads is ensured.

Figure 4:
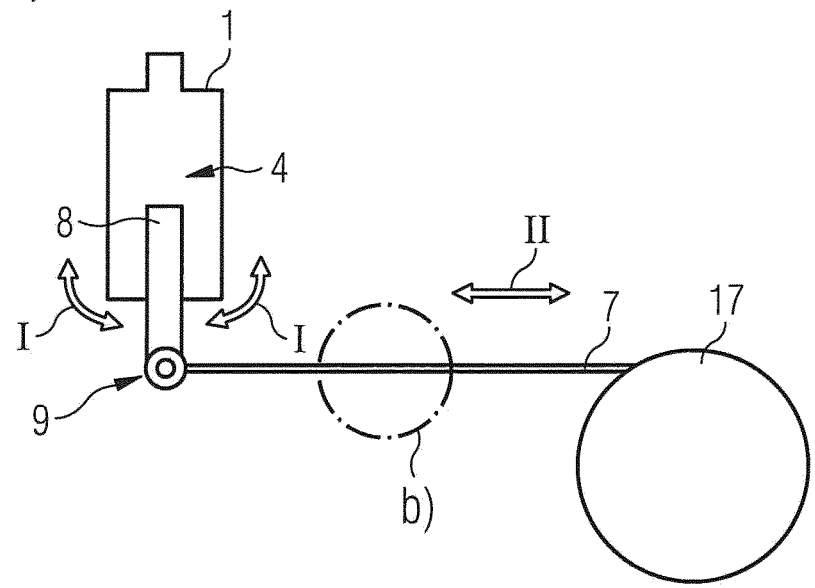
FIG. 4 partially shows an additional power steering subassembly according to the proposal, in FIG. 4a) as a schematic view and in FIG. 4b) with an absorption unit according to the proposal in detail as a schematic illustration.
Figure 4:
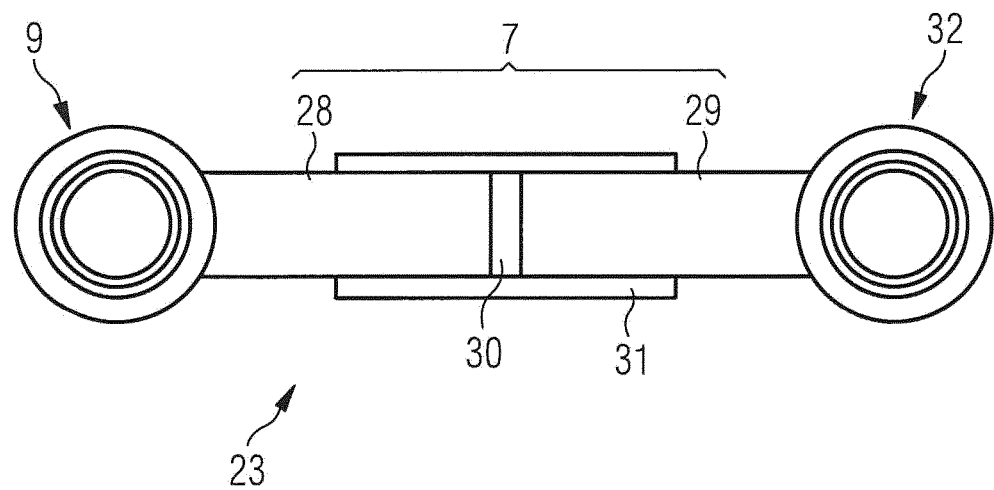

Another embodiment of an absorption unit 23 according to the proposal is illustrated in FIG. 4. FIG. 4a) shows an embodiment which substantially corresponds to the power steering subassembly illustrated in FIG. 3a). In this regard, reference may be made to the description therein. In the present embodiment according to FIG. 4, however, one difference is that the absorption unit 23 is not integrated in the ball joint 9 but instead integrated in the thrust rod 7. However, it is also possible in the power steering subassembly according to the proposal to provide two absorption units 23, that is to say, firstly one absorption unit 23 integrated in the ball joint 9 according to FIG. 3 and additionally one other absorption unit 23 which is described below and which is integrated in the thrust rod 7. Additional combinations with the absorption unit 23 described below are also possible.

The detailed view of FIG. 4b) shows that the thrust rod 7 is divided into two portions 28 and 29. A division into a plurality of portions would also be possible. The absorption unit 23 which is integrated in the thrust rod 7 is formed by a resilient element which is arranged between the two portions 28, 29 of the thrust rod 7 in the form of an elastomer material or spring assembly 30. The elastomer material or spring assembly 30 preferably forms the connection between the two portions 28, 29 of the thrust rod 7. Abrupt movements can advantageously be compensated for by the absorption unit 23 which is integrated in the thrust rod 7 before they are introduced into the steering gear 1 and can cause damage to sensitive components.

The two portions 28, 29 of the thrust rod 7 can be connected via the elastomer material or spring assembly 30 in such a manner that small axial relative movements, with respect to the thrust rod axis, of the two portions 28, 29 are possible relative to each other. Particularly forces which are directed substantially parallel with the thrust rod axis are damped by the proposed arrangement in a particularly advantageous manner. Accordingly, the loads or stresses which are caused by shocks from the road in a power steering subassembly can advantageously be damped at the translation side of the power steering subassembly. The relative movements of the components which adjoin the absorption unit 23 in the form of the portions 28 and 29 relative to each other ensure the selective conversion of kinetic energy to potential energy within the absorption unit 23.

In the embodiment illustrated, a thrust rod sleeve 31 is further provided. The thrust rod sleeve 31 is arranged in this instance in such a manner that it at least partially surrounds the two portions 28, 29 of the thrust rod 7 and completely externally surrounds the elastomer material or spring assembly 30 which is arranged between the two portions 28, 29 of the thrust rod 7. In an advantageous manner, the elastomer material or spring assembly 30 can particularly be protected by the thrust rod sleeve 31.

The thrust rod sleeve 31 can in this instance, for example, be connected to only one of the two portions 28, 29 and accordingly be configured in a displaceable manner relative to the other of the two portions 28, 29. Thus, the two portions 28, 29 can carry out small axial relative movements relative to each other which are damped or attenuated by the elastomer material or spring assembly 30, whereby the shocks are advantageously compensated for as a result before they are introduced into the steering gear 1. The thrust rod sleeve 31 can also be directly connected to neither of the two portions 28, 29 but instead fixed to additional components of the power steering subassembly.

The ball joint 32 which is illustrated at the right edge according to FIG. 4b) serves to connect in an articulated manner the thrust rod 7 to the steering lever 16, as can be seen in FIG. 2, via which the wheel 17 to be steered is pivoted about the steering axle 18.

Figure 5:
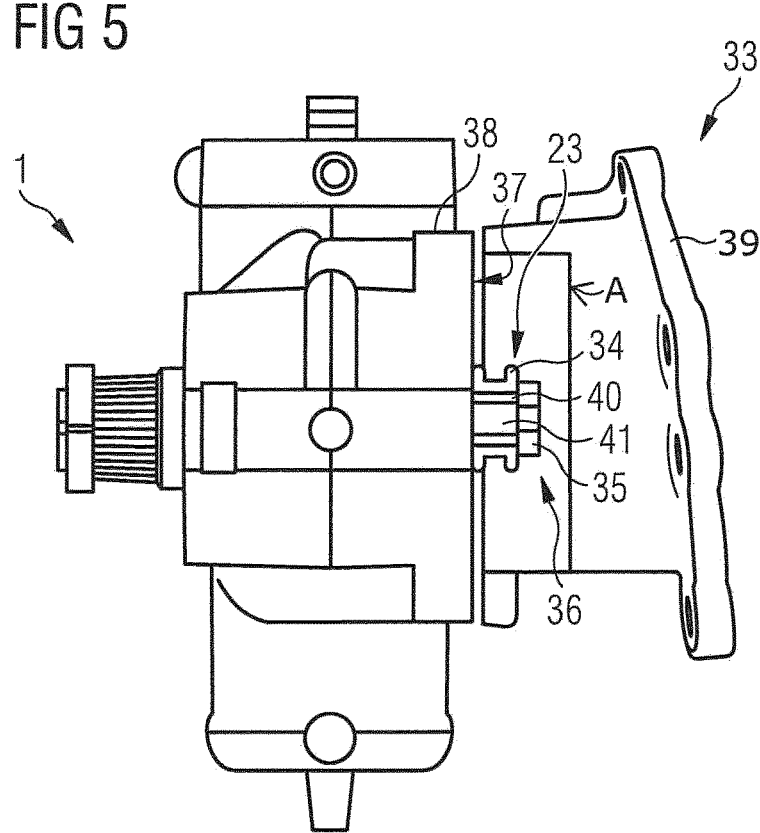
FIG. 5 partially shows an additional power steering subassembly according to the proposal as a schematic view.

FIG. 5 shows an additional embodiment of an absorption unit 23 according to the proposal. The absorption unit 23 is in this case integrated in a fixing arrangement 33 for fixing the steering gear 1 to the frame 22 (not illustrated) of the motor vehicle 10. In this case, the absorption unit 23 integrated in the fixing arrangement 33 is at least partially formed by a resilient element, in this case in the form of the elastomer material 34.

In this case, the at least one elastomer material 34 is further at least partially arranged between a head 35 of a fixing screw 36 and an assembly side 37 of the housing 38 of the steering gear 1 in such a manner that the at least one elastomer material 34 is pressed together in the illustrated, assembled state by screwing in the fixing screw 36. The elements are visible as a result of the drawing cut-out A in FIG. 5 in the beam 39.

As a result of the fixing screw 36, the steering gear 1 is fixed to the beam 39, in particular to a longitudinal beam, of the frame 22 (which is not illustrated in FIG. 5) of the motor vehicle 10. The beam 39 is generally screwed to the frame 22 of the motor vehicle 10. The beam 39 acts as an adapter in order to optimally integrate the steering gear 1 in the available structural space and to connect it to the vehicle frame. Depending on the vehicle type, the beam 39 can accordingly be configured differently. It would also be conceivable to fit the steering gear 1 directly to the vehicle frame. The steering gear 1 is fixed to the beam 39 or the frame 22 in a type-dependent manner with fixing screws 36. Generally, a plurality of fixing screws 36 are also provided and can then generally also all include an elastomer material 34 as an absorption unit 23.

Furthermore, a spacer sleeve 40 is provided in the fixing arrangement 33. The spacer sleeve 40 is arranged between the assembly side 37 of the housing 38 of the steering gear 1 and the beam 39. Furthermore, the elastomer material 34 which forms the absorption unit 23 which is integrated in the fixing arrangement 33 surrounds the spacer sleeve 40 externally, wherein the spacer sleeve 40 again surrounds a shaft 41 of the fixing screw 36 externally. Thus, a predefined pressing together or a predefined compression of the elastomer material 34 can advantageously be achieved because the spacer sleeve 40 can predetermine a predefined spacing up to which the fixing screw 36 can be screwed in before the head 35 strikes the spacer sleeve 40. The spacer sleeve 40 is configured to act counter to the fixing screw 36 with a resistance in order not to compress the elastomer material 34 too powerfully. The fixing screw 36 is securely tightened up to the stop against the spacer sleeve 40.

As a result of an absorption unit 23, as illustrated and described in the context of FIG. 5, particularly shocks and resultant forces or loads can be selectively damped or compensated for, which shocks and resultant forces or loads without such an absorption unit 23 would otherwise have been introduced in a substantially non-damped manner via the fixing arrangement 33 into the housing 38 of the steering gear 1 and thereby into the interior of the steering gear 1 to the components which are sensitive to mechanical loads. In the embodiment illustrated, the power steering subassembly according to the proposal acting as an entire subassembly is fixed to or suspended on the frame 22 of the motor vehicle 10 in a resilient manner to a given extent via the absorption unit 23 in the form of the elastomer material 34 or the elastomer materials 34. The power steering subassembly or in particular the steering gear 1 can consequently give way in the event of shocks from the road, whereby the loads introduced into the steering gear 1 can be reduced.

Figure 6:
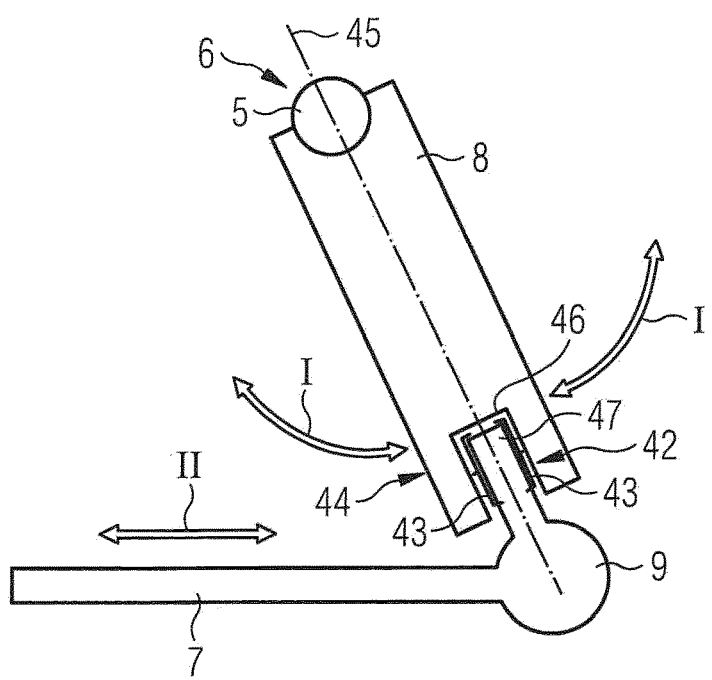
FIG. 6 partially shows an additional power steering subassembly according to the proposal as a schematic view.

FIG. 6 illustrates an additional embodiment of an absorption unit 23. The steering lever 8 which connects the output side 4 of the steering gear 1 to the thrust rod 7 is shown. In the case specifically illustrated, the output side 4 of the steering gear 1 is formed by the output shaft 6 in the form of the segmented shaft 5. The ball joint 9 connects, as already described above, the steering lever 8, which can carry out the rotational movement which is denoted by means of the curved double-headed arrow I, to the thrust rod 7 which can carry out the translational thrust rod movement (double-headed arrow II) in an articulated manner.

The absorption unit 23 of the power steering subassembly according to FIG. 6 is integrated in a transition 42 from the steering lever 8 to the thrust rod 7. In specific terms, the absorption unit 23 which is integrated in the transition 42 from the steering lever 8 to the thrust rod 7 is formed by a resilient element 43, in particular by an elastomer material. In this case, the resilient element 43 is arranged at an end 44, facing the thrust rod 7, of the steering lever 8 in such a manner that the resilient element 43 forms an at least positive-locking connection to the articulated connection of the thrust rod 7, that is to say, in this case to the ball joint 9 which connects the steering lever 8 to the thrust rod 7.

The resilient element 43 is arranged in this case at the end 44, facing the thrust rod 7, of the steering lever 8 in a front receiving member 46, which is central with respect to a steering lever axis 45, of the steering lever 8. Furthermore, the resilient element 43 is arranged so as to externally surround a connection piece 47 of the ball joint 9 which connects the steering lever 8 to the thrust rod 7.

As a result of the embodiment of the absorption unit 23 of the power steering subassembly, as illustrated in FIG. 6, shocks from the road can advantageously be damped or compensated for effectively in that the forces which are introduced by the shocks into the thrust rod 7 are at least partially absorbed and thereby damped by the resilient element 43 which is integrated in this transition 42 when these forces are transmitted via the ball joint 9 to the steering lever 8. There is produced a selective conversion of kinematic energy to potential energy in the resilient element 43. In this case, the resilient element 43 selectively allows according to specifications at least small relative movements of the components, which are directly in abutment with the resilient element 43, of the power steering subassembly in the form of the connection piece 47 of the ball joint 9 and the steering lever 8.

Figure 7:
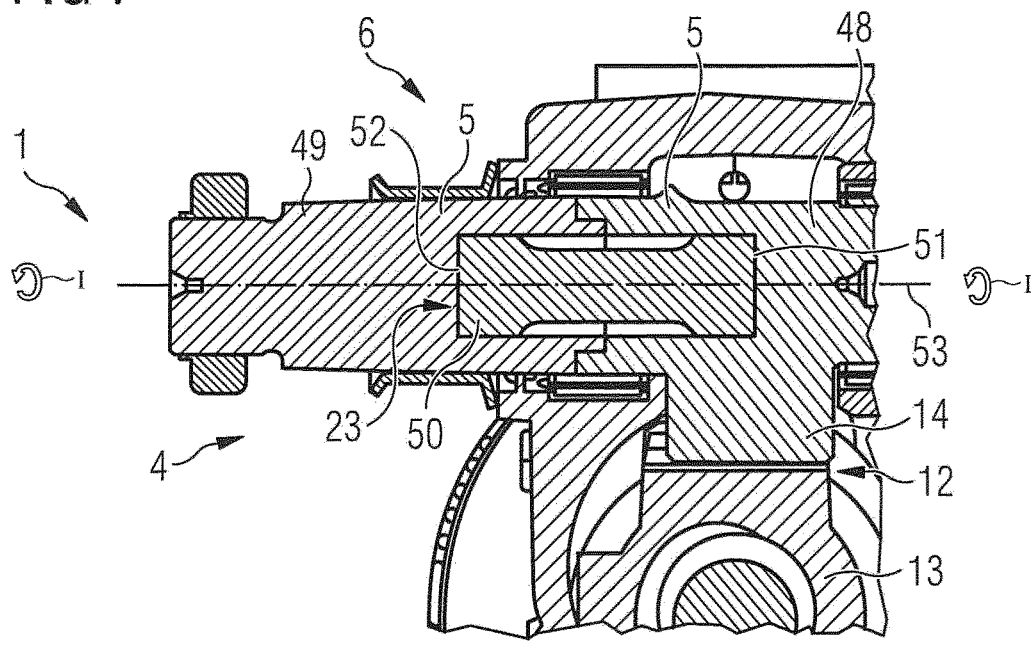
FIG. 7 partially shows a steering gear of a power steering subassembly according to the proposal as a sectioned view.
Figure 8:
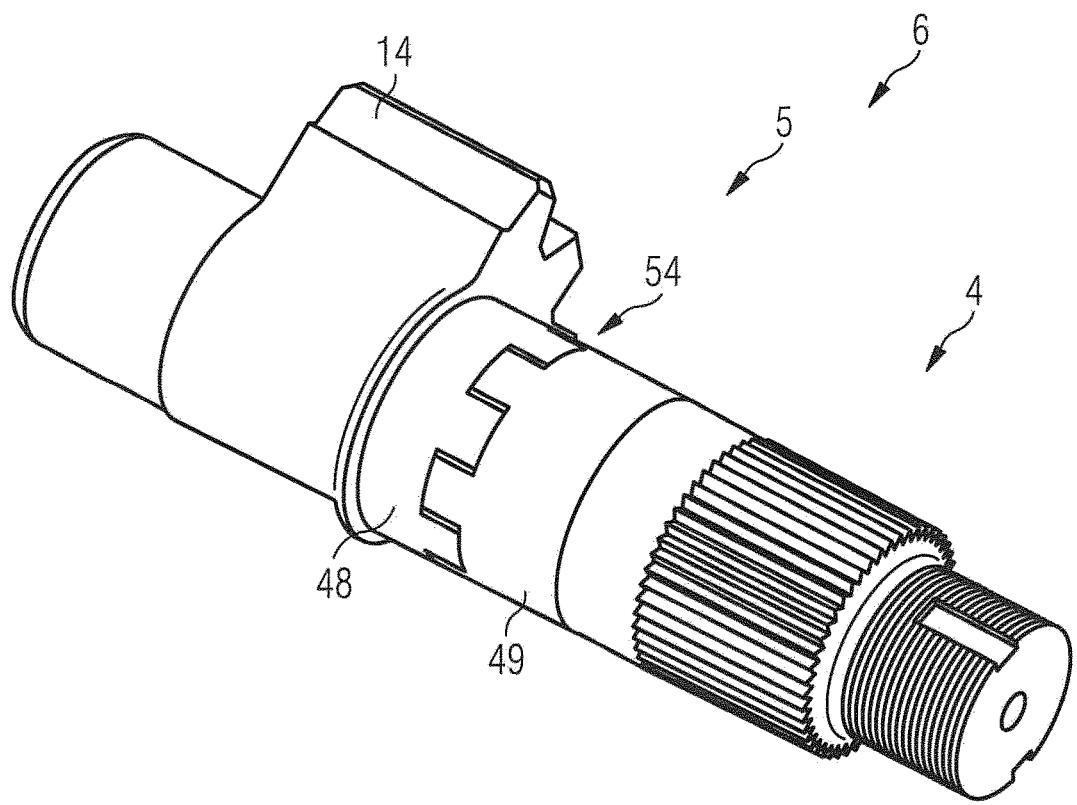
FIG. 8 shows a perspective view of the output shaft or divided segmented shaft of the steering gear of the power steering subassembly according to the proposal from FIG. 7.

FIGS. 7 and 8 illustrate an additional embodiment of an absorption unit 23 according to the proposal for the power steering subassembly according to the proposal. In this case, FIG. 7 shows the absorption unit 23 and the components surrounding them as a sectioned view while in FIG. 8 a number of components of the corresponding steering gear 1 of the power steering subassembly are illustrated from the exterior as a perspective view without the absorption unit 23 being visible directly.

The recirculating ball nut 13 with the external tooth arrangement 12 which is in engagement in a meshing manner with the segment tooth arrangement 14 can be seen, whereby the translational movement of the recirculating ball nut 13 (cf. double-headed arrow IV in FIG. 1) is converted into a rotational movement of the segment tooth arrangement 14 (arrow I) and consequently also of the output shaft 6 in the form of the segmented shaft 5.

The output shaft 6 or segmented shaft 5 is in the form of a divided segmented shaft 5 in this case. Accordingly, the segmented shaft 5 has an inner portion 48 which is illustrated on the right and an output portion 49 which is illustrated on the left. The inner portion 48 of the segmented shaft 5 is associated with the inner side of the steering gear 1 and, as described above, connected to the recirculating ball nut 13 and therefore finally also faces the input side 2 of the steering gear 1. However, the output portion 49 of the segmented shaft 5 is associated with the output side 4 of the steering gear 1. The connection of the steering lever 8—not illustrated in FIGS. 7 and 8—is accordingly carried out according to specifications with respect to the output portion 49.

The absorption unit 23 which can be seen in FIG. 7 and which is in accordance with the proposal is integrated in the output shaft 6. In specific terms, the absorption unit 23 is formed by a torsion spring 50 which is arranged between the inner portion 48 and output portion 49 of the output shaft 6. In this case, the torsion spring 50 is arranged in such a manner that the torsion spring 50 connects the inner portion 48 and the output portion 49 of the output shaft 6 to each other in a positive-locking and/or non-positive-locking manner. In this manner, a rotational movement of the inner portion 48 of the output shaft 6 is transmitted via the torsion spring 50 to the output portion 49 of the output shaft 6 and vice versa. In this case, as a result of the resilience thereof, the torsion spring 50 selectively permits according to specifications at least small relative movements of the components, which directly abut the absorption unit 23 in the form of the torsion spring 50, of the power steering subassembly in the form of the inner portion 48 and the output portion 49. In specific terms, a relative rotation of the inner portion 48 and the output portion 49 can take place, wherein the resiliently constructed absorption unit 23 is rotated. In this manner, there may be produced a selective conversion from kinetic energy to potential energy in the absorption unit 23 in the form of the torsion spring 50.

Before shock pulses from the road result in damage being caused to sensitive components of the steering gear 1, the torsion spring 50 accordingly ensures a selective damping or a selective compensation for loads or stresses which result from the shocks and which would otherwise be introduced via the steering lever 8 to the segmented shaft 5 and then, for instance, without any selective compensation by means of the torsion spring 50 into the sensitive tooth arrangement pairing of the segment tooth arrangement 14 with the external tooth arrangement 12 of the recirculating ball nut 13.

The torsion spring 50 is arranged centrally with the opposite ends thereof firstly in a central, front receiving member 51 of the inner portion 48 of the segmented shaft 5 (illustrated on the right) and with the opposite end in a central front receiving member 52 of the output portion 49 of the segmented shaft 5 (illustrated on the left). In this case, the torsion spring 50 is arranged centrally on a segmented shaft axis 53 of the segmented shaft 5.

As can be seen in particular in FIG. 8, the mutually facing front sides of the inner portion 48 and the output portion 49 of the output shaft 6 each have claw-like connection portions 54 which engage one in the other. The two portions of the divided segmented shaft 5 in the form of the inner portion 48 and output portion 49 are engaged with each other in a positive-locking manner via the claw-like connection portions 54. In this case, however, a predefined play is provided in the circumferential direction so that the individual claw-like portions do not touch each other in a circumferential direction according to specifications in the assembly state. It is thereby ensured that the rotational movement between the two portions, inner portion 48 and output portion 49, of the segmented shaft 5 is selectively transmitted to a specific extent exclusively via the absorption unit 23 in the form of the torsion spring 50 and at least not directly in the basic state via the claw-like portions of the claw-like connection portions 54 which engage one in the other. Nevertheless, the claw-like connection portions 54 simultaneously also delimit the relative rotation of the components, inner portion 48 and output portion 49, relative to each other. This is also particularly advantageous for the reason that, even if the torsion spring 50 fails, the structural integrity of the segmented shaft 5 which is formed by the two portions, inner portion 48 and output portion 49, is still provided and consequently the fundamental functionality of the steering gear 1 also continues to be provided.

Figure 9:
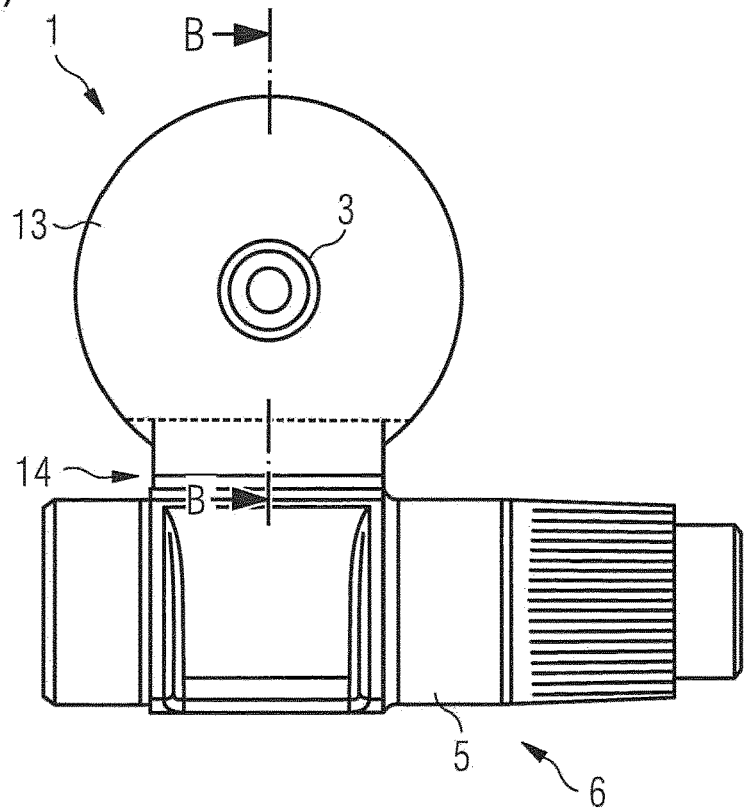
FIG. 9 partially shows a steering gear of a power steering subassembly according to the proposal, in FIG. 9a) as a schematic view and in FIG. 9b) as a sectioned view B-B from FIG. 9a).
Figure 9:
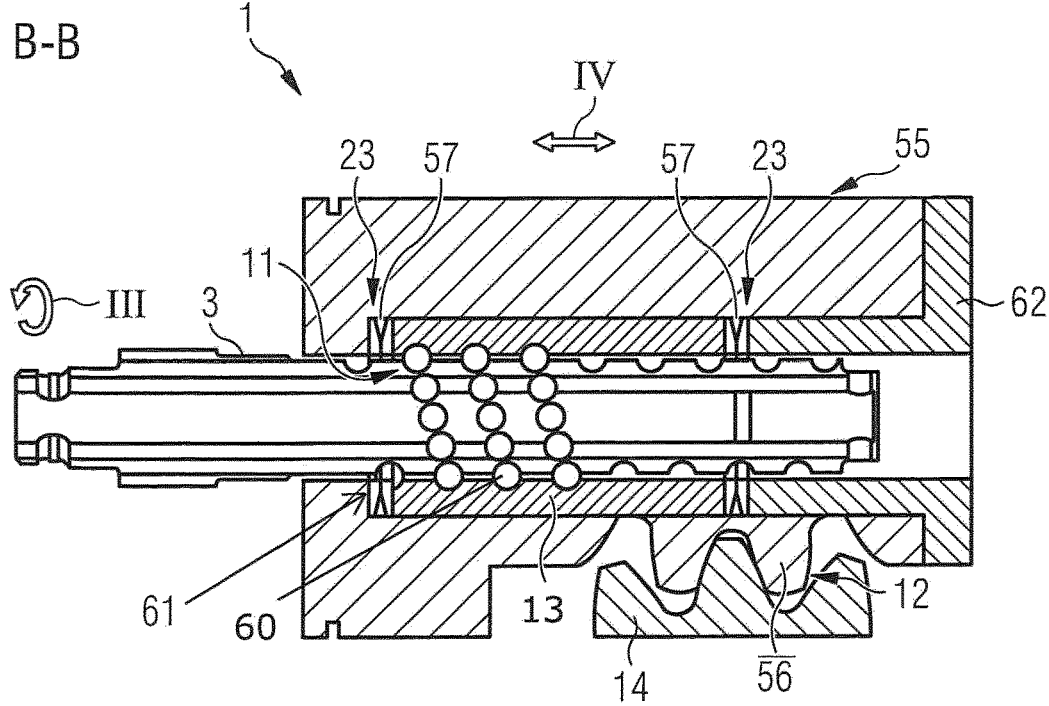
Figure 10:
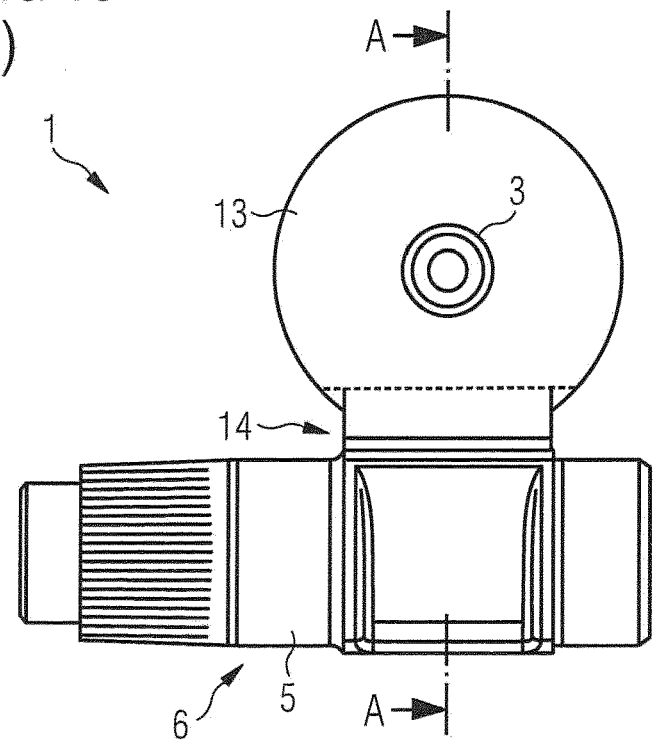
FIG. 10 partially shows a steering gear of a power steering subassembly according to the proposal, in FIG. 10a) as a schematic view and in FIG. 10b) as a sectioned view A-A from FIG. 10a).
Figure 10:
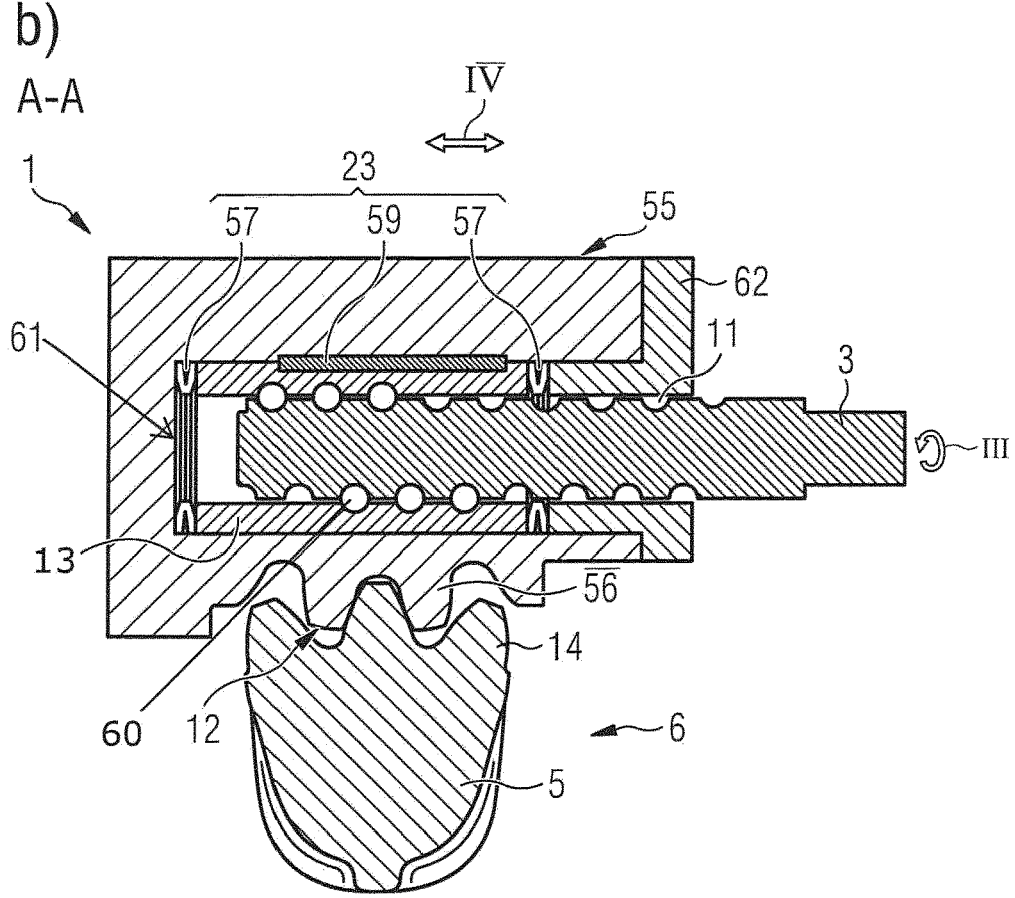
Figure 11:
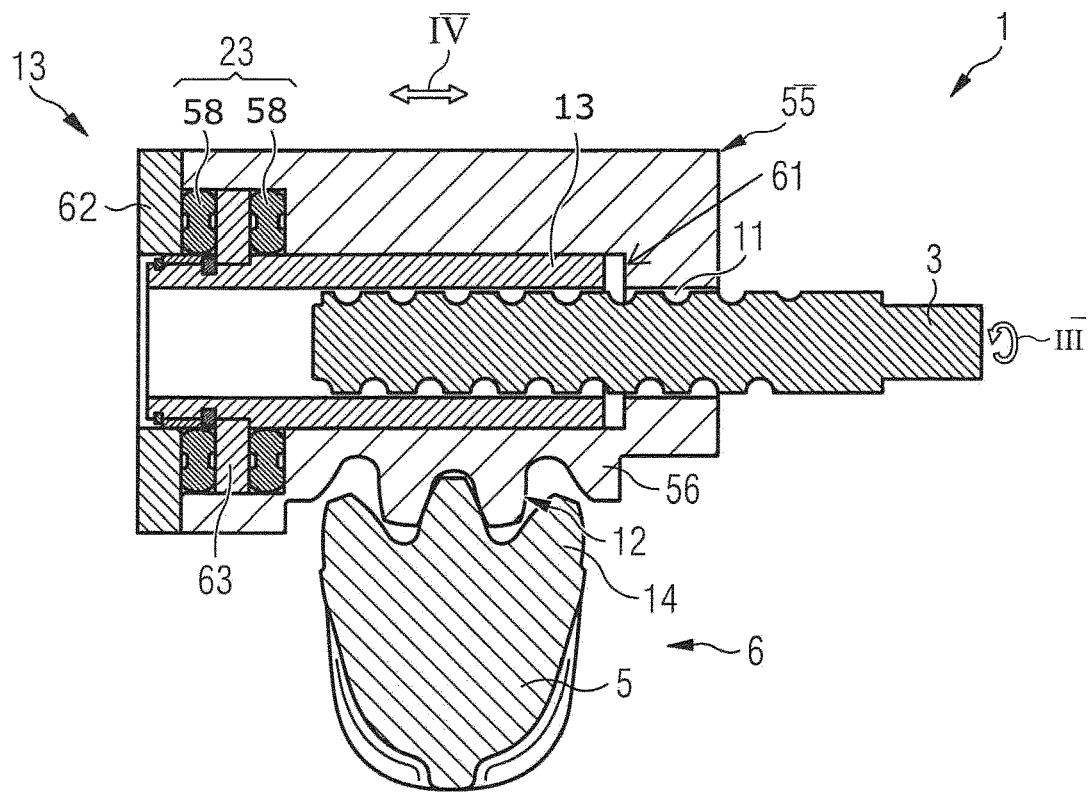
FIG. 11 partially shows a steering gear of an additional power steering subassembly according to the proposal according to the sectioned view A-A from FIG. 10a).

FIGS. 9, 10 and 11 illustrate additional embodiments of an absorption unit 23 of the power steering subassembly according to the proposal. The partially illustrated steering gear 1 of the corresponding power steering subassemblies according to the proposal have an input shaft 3 which is in the form of a spindle 11 and, furthermore, a recirculating ball nut 13 and also a toothed rack 55 for converting the rotational movement of the input shaft 3 (arrow III) into a translational movement (double-headed arrow IV). In order to transmit this translational movement (double-headed arrow IV) again, the toothed rack 55 has externally a tooth arrangement portion 56 which provides the external tooth arrangement 12. The tooth arrangement portion 56 or the external tooth arrangement 12 is then in engagement with the segmented shaft 5 which at least partially forms the output side 4 of the steering gear 1 and again brings about the desired rotational movement of the segmented shaft 5 (cf. double-headed arrow I in FIG. 1) as a result of the translational movement (double-headed arrow IV) thereof.

The steering gear 1 is partially schematically illustrated in FIG. 9a) and also in FIG. 10a). FIG. 9b) shows the sectioned view B-B from FIG. 9a). In turn, FIG. 10b) shows the sectioned view A-A from FIG. 10a). FIG. 11 shows another embodiment which is also illustrated as a sectioned view in accordance with the lines A-A from FIG. 9a).

The absorption unit 23 of the power steering subassemblies illustrated in FIGS. 9 to 11 is arranged in such a manner that the translational movement of the recirculating ball nut 13 (double-headed arrow IV) is transmitted via the absorption unit 23 to the tooth arrangement portion 56 and vice versa, that is to say, a translational movement of the tooth arrangement portion 56 is also transmitted via the absorption unit 23 to the recirculating ball unit 13. In this case, the absorption unit 23 is formed from at least one resilient element, that is, in the variants according to FIGS. 9 and 10, two disk springs 57 or, in the variant according to FIG. 11, two elastomer materials 58. Combinations comprising elastomer materials, disk springs or helical springs are also possible.

In the direction corresponding to the translational movement of the recirculating ball nut 13 (double-headed arrow IV), the two components, recirculating ball nut 13 and toothed rack 55 with tooth arrangement portion 56, are configured in principle in a movable manner relative to each other. The two components, recirculating ball nut 13 and toothed rack 55 with tooth arrangement portion 56, are fixed in a rotationally secure manner relative to each other in the rotation direction corresponding to the rotational movement of the input shaft 3 (arrow III) again. To this end, a feather key 59 which is merely illustrated in the embodiment according to FIG. 10b) is provided. As a result of the feather key 59, the recirculating ball nut 13 is secured relative to the toothed rack 55 against rotation. In FIGS. 9b) and 10b), the balls 60 of the recirculating ball steering system are further illustrated, while the explicit illustration thereof was dispensed with in FIG. 11.

The absorption unit 23 which is formed from at least one resilient element permits in all three illustrated embodiments relative movements of the components which abut the absorption unit 23, wherein the absorption unit 23 is subjected to resilient compression and in this manner converts kinetic energy to potential energy according to specifications in the case of excessively powerful or abrupt movements which can be caused by shocks from the road. It is thereby possible to advantageously compensate for the loads which are applied inside the steering gear 1 and which are caused by the shocks from the road.

To this end, in all three illustrated embodiments of FIGS. 9 to 11, the recirculating ball nut 13 is received in a central hole, which has a planar face 61, of the toothed rack 55 and, at the opposite side of the planar face 61, secured with a cover 62. To this end, the cover 62 strikes with the upper, circumferential support face against the front end of the toothed rack 55, which front end of the planar face 61 of the central hole is arranged opposite. Furthermore, the covers 62 each have according to the embodiments in FIG. 9b) and FIG. 10b) axially extending introduction portions which each project into the central hole of the toothed rack 55. The covers 62 are securely connected to the toothed rack 55, preferably via the front ends, facing away from the planar faces 61, of the toothed rack 55.

In specific terms, in the case of an abrupt linear movement of the recirculation ball nut 13 toward the left in the embodiments illustrated in FIG. 9b) and FIG. 10b), initially the left disk springs 57 are each compressed while in the embodiment illustrated in FIG. 11 initially the elastomer material 58 illustrated on the left is compressed, whereby the desired compensation is selectively achieved. Conversely, in the event of abrupt movements of the respective recirculating ball nut 13 to the right, the right disk springs 57 or the right elastomer material 58 are compressed.

Such abrupt movements are compensated for as follows with respect to the toothed rack 55 or the tooth arrangement portion 56 or the segmented shaft 6: thus, an abrupt redirection of these components to the left in the embodiments according to FIG. 9b) and FIG. 10b) initially results in the respective cover 62 which is securely connected to the toothed rack 55 carrying out a movement to the left. These movements to the left in turn result in the respective axial portions of the covers 62 initially compressing the right disk springs 57 before they apply forces to the respective recirculating ball nuts 13. Again in the opposite direction, when the toothed rack 55 carries out an abrupt movement to the right, initially the left disk spring 57 adjacent to the respective planar face 61 is compressed before the corresponding loads are transmitted to the respective recirculating ball nut 13.

In the embodiment according to FIG. 11 again, an abrupt movement of the toothed rack 55 to the left results in the right elastomer material 58 initially being compressed before the movement is transmitted to the recirculating ball nut 13 via an adjacent annular element 63. In the opposite direction again, in the event of an abrupt movement of the toothed rack 55 to the right, initially the cover 62 is moved to the right and thereby compresses the adjacent left elastomer material 58 before the movement is transmitted to the recirculating ball nut via the annular element 63.

The illustrated embodiments of FIGS. 9 to 11 have in common that the absorption unit 23 is arranged in such a manner that the translational movement of the recirculating ball nut 13 (double-headed arrow IV) is transmitted to the tooth arrangement portion 56 of the toothed rack 55 via the absorption unit 23, and vice versa.

This tooth arrangement portion 56 of the toothed rack 55 is again engaged with the segmented shaft 5 which at least partially forms the output side 4 of the steering gear 1. Furthermore, the toothed rack 55 forms a separate component from the internal recirculating ball nut 13. The absorption unit 23 finally forms a connection location between the respective recirculating ball nut 13 and the tooth arrangement portion 56 which performs the function of the external tooth arrangement 12 for the tooth arrangement pairing with the segmented shaft 6.

Via the described absorption units 23 of FIGS. 9 to 11, at least small relative movements of the adjoining components of the power steering subassembly are possible and again ensure the desired compensation for the shocks from the road as a result of selective conversion of kinetic energy into potential energy within the absorption units 23.

In the embodiments of FIG. 9b) and FIG. 10b), the recirculating ball nut 13 is pretensioned displaceably between the disk springs 57 in the toothed rack 55, that is, arranged in the central hole of the toothed rack 55. The pretensioning is dependent in this case on the length of the recirculating ball nut 13 and the height of the disk spring pillars of the disk springs 57 and the length of the respective axial portion of the cover 62. The translational force path is brought about via the disk springs 57 alternately, in a manner supported against the planar face 61 in the hole of the toothed rack 55 and at the opposite side of the small planar face of the axial portion of the cover 62.

Figure 12:
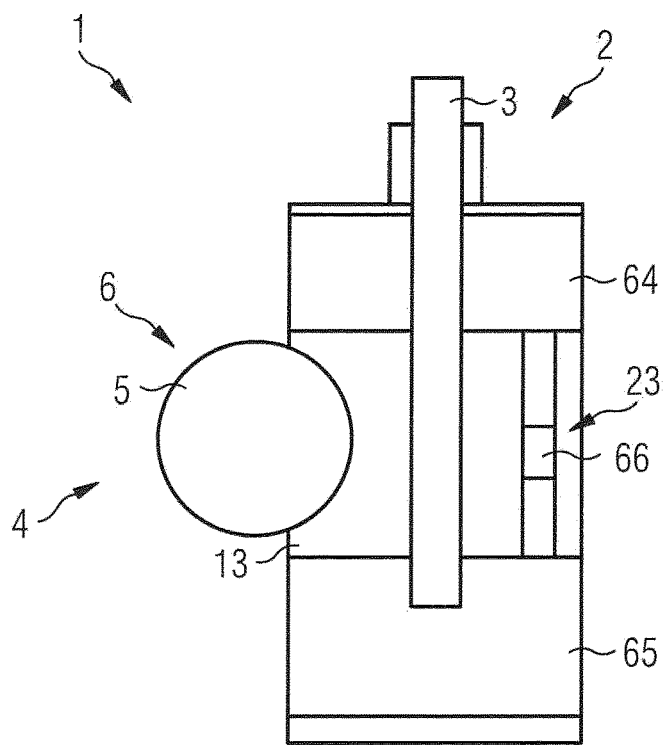
FIG. 12 partially shows a schematic view of a steering gear of a hydraulic recirculating ball steering system of a power steering subassembly according to the proposal.

FIG. 12 illustrates another embodiment of an absorption unit 23 of the power steering subassembly according to the proposal. In this embodiment, the power steering subassembly according to the proposal comprises a recirculating ball steering system which is merely schematically illustrated in FIG. 12. Thus, FIG. 12 schematically shows the output side 4 of the steering gear 1 in the form of the output shaft 6 which is in the form of the segmented shaft 5 and the input shaft 3 which forms the input side 2 of the steering gear 1 and which is in the form of a spindle 11. During a rotational movement of the input shaft 3, the recirculating ball nut 13 which is in the form of a hydraulic piston or piston moves in translation.

A hydraulic unit is provided in the recirculating ball steering system for hydraulically supporting the steering. In this case, the hydraulic unit of the recirculating ball steering system has two oil chambers 64 and 65 which are arranged at opposite sides of the piston or the recirculating ball nut 13 and which are separated from each other for hydraulically supporting the steering.

The absorption unit 23 according to the proposal is at least partially integrated in the hydraulic unit of the recirculating ball steering system. In this case, the absorption unit 23 is formed by a compensation element 66 which connects two oil chambers 64, 65 to each other, for example, by a valve or by an aperture.

Figure 13:
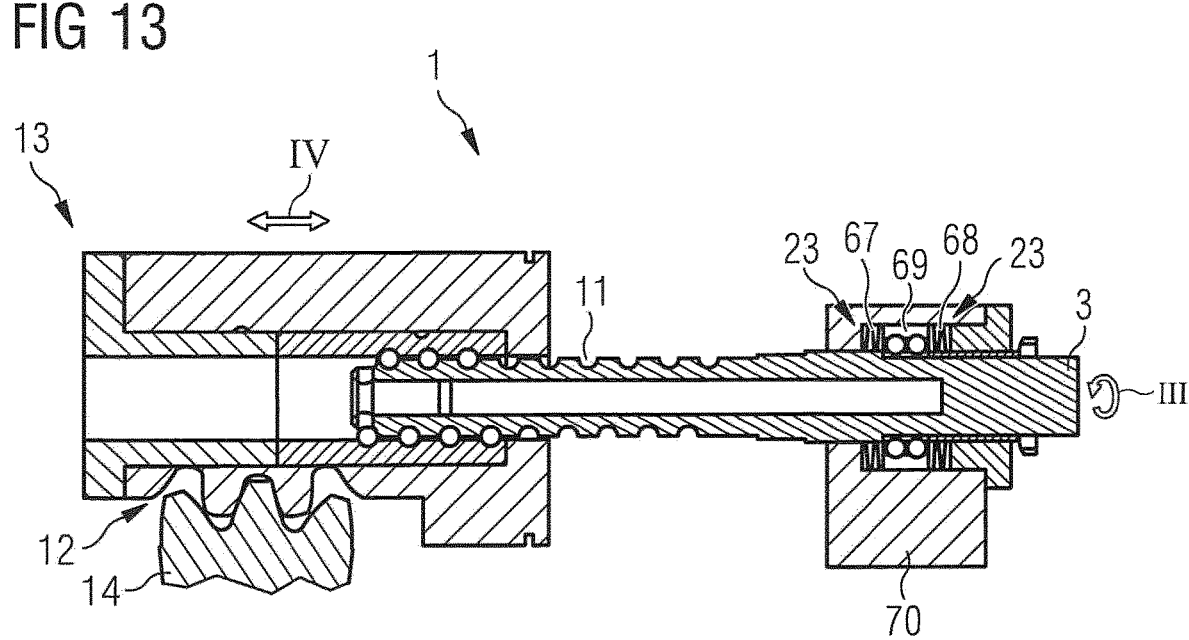
FIG. 13 partially shows a steering gear of a power steering subassembly according to the proposal as a sectioned view.
Figure 14:
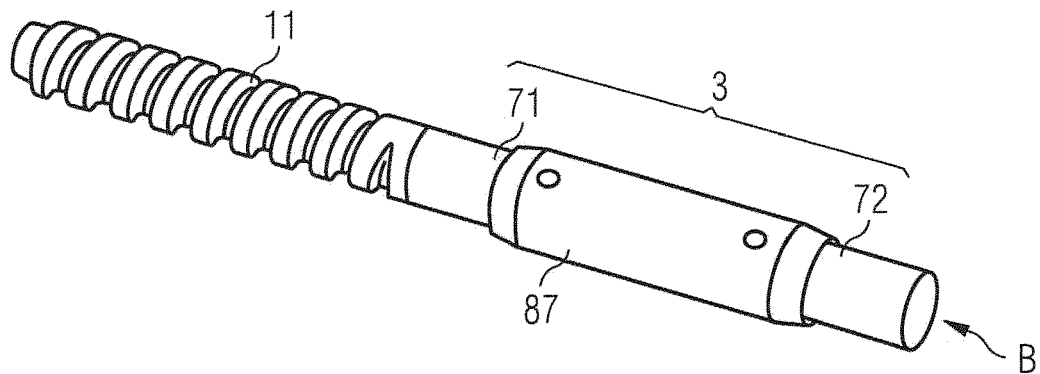
FIG. 14 shows an input shaft of a power steering subassembly according to the proposal in FIG. 14a) as a perspective view in an assembled state, in FIG. 14b) as a front view from the direction B from FIG. 14a) and in FIG. 14c) as a sectioned view according to the section A-A in FIG. 14b).
Figure 14:
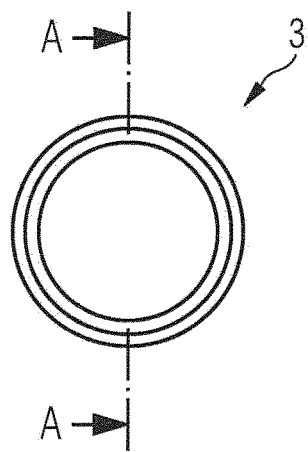
Figure 14:
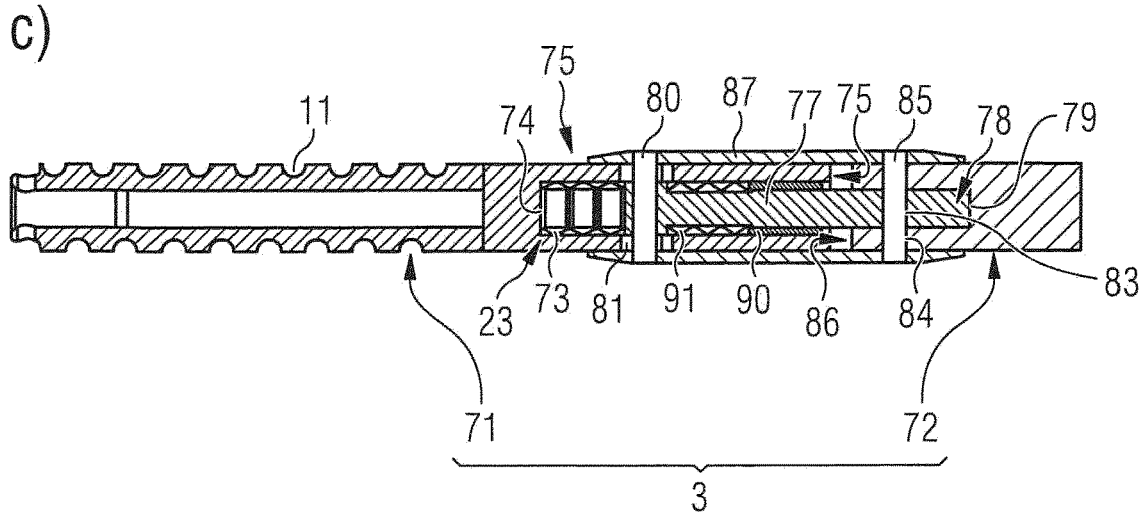
Figure 15:
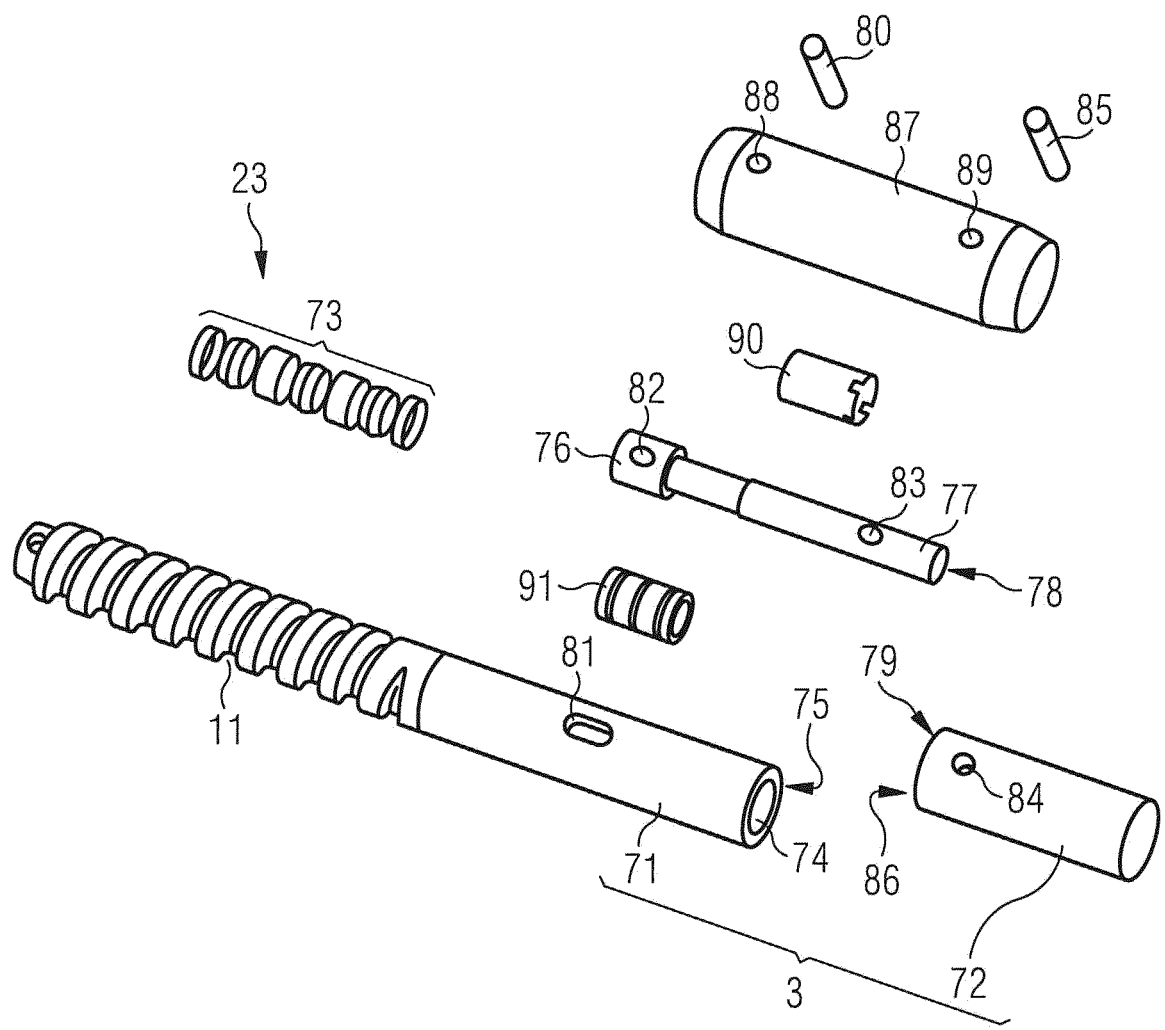
FIG. 15 shows the input shaft of the power steering subassembly according to the proposal from FIG. 14a) as a view of all the individual portions in a non-assembled state.

FIGS. 13, 14 and 15 illustrate additional embodiments of an absorption unit 23 of the power steering subassembly according to the proposal. In the illustrated embodiments, the steering gear 1 has an input shaft 3 which is in the form of a spindle 11 and a recirculating ball nut 13 for converting the rotational movement of the input shaft 3 (arrow III) into a translational movement (double-headed arrow IV). According to the proposal, the absorption unit 23 is at least partially in the form of an axial, resilient spindle bearing of the input shaft 3 in this case.

In the embodiment according to FIG. 13, the absorption unit 23 which is in the form of an axial, resilient spindle bearing of the input shaft 3 is formed by at least one resilient element, specifically by the disk springs 67 and the disk springs 68. In this case, the disk springs 67 and 68 are arranged in abutment against a bearing arrangement of the input shaft 3 for rotatably supporting the input shaft 3, specifically against the two-rowed angular ball bearing 69, in a housing 70 in such a manner that the bearing arrangement of the input shaft 3 is axially resiliently received in the housing 70 via the disk springs.

By means of the absorption unit 23 illustrated in the form of the two disk springs 67, 68, shocks which result from the road and which can be introduced, for example, via the segmented shaft 6 with the segment tooth arrangement 14 can be selectively compensated for. Thus, the sleeve which surrounds the input shaft 3 and the inner ring of the angular ball bearing 69 rotate with the input shaft 3 (arrow III). The outer ring of the angular ball bearing 69 is again arranged in the housing 70 of the steering gear in a rotationally secure but axially displaceable manner. The absorption unit 23 in the form of the disk springs 67, 68 is again in abutment at both sides, that is to say, the disk spring 67 on the left and the disk spring 68 on the right, against the outer ring of the bearing 69. In the event of shocks at the spindle side, an axial, damped movement thereby takes place because the disk spring 67 is compressed in the case of an abrupt movement of the input shaft 3 to the left and the disk spring 68 is compressed in the case of an abrupt movement of the input shaft 3 to the right. The internal diameter of the disk springs 67, 68 is greater than the diameter of the sleeve or the input shaft 3. As a result of the illustrated absorption unit 23, small relative movements of the adjoining components of the power steering subassembly are accordingly permitted again in a selective manner, which movements again ensure a selective conversion from kinetic energy into potential energy and consequently also compensation for shocks from the road.

In the embodiment according to FIGS. 14 and 15, the input shaft 3 in the form of a spindle 11 is constructed in several pieces by at least one spindle portion 71 which faces the recirculating ball nut 13 and an input portion 72. In FIG. 14a), the input shaft 3 in the assembled state is illustrated as a perspective view while FIG. 14b) shows the corresponding input shaft 3 as a front view according to the arrow B from FIG. 14a). In FIG. 14c), the input shaft 3 is then illustrated as a longitudinal section according to the section A-A from FIG. 14b). FIG. 15 again shows the same input shaft 3, but in a non-assembled state, that is to say, broken down into all the individual components.

The spindle portion 71 and the input portion 72 of the input shaft 3 are connected to each other in a rotationally secure manner. However, the spindle portion 71 and the input portion 72 are also connected to each other in an axially resilient manner via the absorption unit 23 which is in the form of an axial resilient spindle bearing of the input shaft 3. In this case, the axial resilient spindle bearing is formed by resilient elements, in the present case by the annular springs 73.

The annular springs 73 are arranged to this end between the spindle portion 71 and the input portion 72. In specific terms, the annular springs 73 are received in a central receiving member 74 at the end 75, facing the input portion 72, of the spindle portion 71. At the side facing away from the base of the receiving member 74, the annular springs 73 abut a front face 76 of a connecting thrust rod 77. This connecting thrust rod 77 is also received largely in the receiving member 74 of the spindle portion 71, but the end 78, facing the input portion 72 of the input shaft 3, of the connecting thrust rod 77 projects out of the receiving member 74 and consequently out of the end 75 of the spindle portion 71.

The connecting thrust rod 77 ensures the rotationally secure connection of the spindle portion 71 to the input portion 72 of the input shaft 3. To this end, the connecting thrust rod 77 is, as described, received in receiving members 74 and 79, on the one hand, of the spindle portion 71 and, on the other hand, of the input portion 72 and connected to each other in a rotationally secure manner with the respective component. To this end, on the one hand, a connection pin 80 which is at the spindle side and which extends in the assembled state both through a slot 81 in the spindle portion 71 and through a through-hole 82 at the spindle side in the connecting thrust rod 77 is provided. The slot 81 is also in the form of a through-hole to this end. The slot 81 and the spindle-side through-hole 82 are brought into alignment with each other to this end in the assembled state. The slot 81 has a greater axial extent, with respect to the axis of the input shaft 3, than the spindle-side through-hole 82.

At the side facing the input portion 72, the connecting thrust rod 77 again has an input-side through-hole 83. Furthermore, the input portion 72 of the input shaft 3 also has a through-hole 84 which is brought into alignment with the input-side through-hole 83 in the assembled state. An input-side connection pin 85 again extends in the assembled state both through the through-hole 84 and through the input-side through-hole 83 so that the input portion 72 and connecting thrust rod 77 are connected to each other in a rotationally secure manner. Furthermore, the input portion 72 and the connecting thrust rod 77 are also connected to each other in an axially secure manner because both the through-hole 84 and the input-side through-hole 83 substantially have the same diameter and the input-side connection pin 85 again also connects the two components when viewed in an axial direction to each other in a positive-locking manner.

As a result of the arrangement described, the input portion 72 and the spindle portion 71 are connected to each other in a rotationally secure manner by means of the components spindle-side connection pin 80, input-side connection pin 85 and connecting thrust rod 77. In this case, sufficient movement play for relatively small axial relative movements between the spindle portion 71 and the input portion 72 is available between the two facing ends of the two components, that is to say, between the end 75, facing the input portion 72, of the spindle portion 71 and the end 86, facing the spindle portion 71, of the input portion 72. The connecting thrust rod 77 can also move axially relative to the spindle portion 71 in that the spindle-side connecting pin 80 is received with axial play in the slot 81 of the spindle portion 71.

Such small axial relative movements are used according to specifications so that shock pulses from the road can be damped or compensated for. The absorption unit 23 in the form of the annular springs 73 which are arranged in abutment against the front face 76 of the connecting thrust rod 77 in the receiving member 74 of the spindle portion 71 is finally used for this purpose. As a result of the relative movements which are received by the absorption unit 23, kinetic energy is converted into potential energy according to specifications and the shocks from the road are consequently compensated for.

Furthermore, an externally arranged protection sleeve 87 which also has a spindle-side through-hole 88 and an input-side through-hole 89 is provided. The spindle-side through-hole 88 is brought into alignment with the spindle-side through-hole 88 of the connecting thrust rod 77 and the slot 81 in the spindle portion 71. Furthermore, the spindle-side connecting pin 80 also extends through the spindle-side through-hole 88 of the protection sleeve 87. The input-side through-hole 89 is again brought into alignment with the input-side through-hole 83 of the connecting thrust rod 77 and the through-hole 84 in the input portion 72. Furthermore, the input-side connecting pin 85 also extends through the spindle-side through-hole 89 of the protection sleeve 87.

The protection sleeve consequently surrounds particularly the connecting thrust rod 77 externally and, furthermore, the axial play between the spindle portion 71 and the input portion 72. Furthermore, the protection sleeve ensures an external guide for the two components, which are configured separately from each other, of the input shaft 3, that is to say, the spindle portion 71 and the input portion 72.

Finally, furthermore, a threaded bush 90 which surrounds the connecting thrust rod 77 partially externally and an additional assembly of annular springs 91 are provided, wherein the annular springs 91 are arranged in abutment against the threaded bush when viewed in an axial direction. The annular springs 91 also form an additional component of the advantageous absorption unit 23 in order to compensate for shocks from the road.

Thus, in an advantageous manner in the power steering subassembly according to the proposal according to the illustrated embodiment, the shocks from the road are compensated for as follows: the input portion 72 of the input shaft 3 is supported axially and radially in its position. Shocks which act on the spindle 11 are damped or compensated for by the assemblies of annular springs 73 and 91. This is because, if the spindle 11 moves to the right in the direction of the input portion 72, the left assembly of annular springs 73 is compressed. Vice versa, in the event of a movement of the input portion 72 to the left, the right assembly of annular springs 91 is compressed, which assembly of annular springs 91 is supported on the threaded bush 90 and the connecting thrust rod 77 which is in turn securely connected to the input portion 72 of the input shaft 3.

LIST OF REFERENCE NUMERALS

1 Steering gear
2 Input side (of steering gear 1)
3 Input shaft
4 Output side (of steering gear 1)
5 Segmented shaft
6 Output shaft
7 Thrust rod
8 Steering lever
9 Ball joint
10 Motor vehicle
11 Spindle
12 External tooth arrangement (of recirculating ball nut 13)
13 Recirculating ball nut
14 Segment tooth arrangement (of segmented shaft 5)
15 Steering wheel
16 Steering lever
17, 19 Wheels (of motor vehicle 10)
18 Steering axle
20 Track lever
21 Track rod
22 Frame (of motor vehicle 10)
23 Absorption unit
24 Bearing shell (of ball joint 9)
25 Elastomer material
26 Ball (of ball joint 9)
27 Outer shell (of ball joint 9)
28, 29 Portions (of thrust rod 7)
30 Elastomer material or spring assembly
31 Thrust rod sleeve
32 Ball joint
33 Fixing arrangement
34 Elastomer material
35 Head (of fixing screw 36)
36 Fixing screw
37 Assembly side (of housing 38 of steering gear 1)

38 Housing (of steering gear 1)
39 Beam
40 Spacer sleeve
41 Shaft (of fixing screw 36)
42 Transition (from steering lever 8 to thrust rod 7)
43 Resilient element (elastomer material)
44 End of steering lever 8 (facing thrust rod 7)
45 Steering lever axle
46 Central receiving member (of steering lever 8)
47 Connection piece (of ball joint 9)
48 Inner portion (of output shaft 6)
49 Output portion (of output shaft 6)
50 Torsion spring
51 Central, front receiving member (of inner portion 48 of segmented shaft 5)
52 Central, front receiving member (of output portion 49 of segmented shaft 5)
53 Segmented shaft axis
54 Claw-like connection portion (of inner portion 48 and output portion 49 of output shaft 6)
55 Toothed rack
56 Tooth arrangement portion
57 Disk springs
58 Elastomer material
59 Feather key
60 Balls
61 Planar face (of central hole in toothed rack 55)
62 Cover
63 Annular element
64, 65 Oil chambers
66 Compensation element (connecting two oil chambers 64, 65 to each other; valve or aperture)
67, 68 Disk springs
69 Angular ball bearing (two-rowed)
70 Housing (of steering gear)
71 Spindle portion (of input shaft 3)
72 Input portion (of input shaft 3)
73 Annular springs
74 Receiving member (of spindle portion 71)
75 End of spindle portion 71 (facing input portion 72)
76 Front face (of connecting thrust rod 77)
77 Connecting thrust rod
78 End of connecting thrust rod 77 (facing the input portion 72)
79 Receiving member (of input portion 72)
80 Spindle-side connection pin
81 Slot (of spindle portion 71)
82 Spindle-side through-hole (of connecting thrust rod 77)
83 Input-side through-hole (of connecting thrust rod 77)
84 Through-hole (of input portion 72)
85 Input-side connection pin
86 End of input portion 72 (facing spindle portion 71)
87 Protection sleeve
88 Spindle-side through-hole (of protection sleeve)
89 Input-side through-hole (of protection sleeve)
90 Threaded bush
91 Annular springs

The invention claimed is:

1. A power steering subassembly for an electromechanical power steering system of a motor vehicle, comprising:
a steering gear, the steering gear being configured to transmit a rotational movement which is introduced from a steering transmitter, via an input side of the steering gear, to an output side of the steering gear, wherein the power steering subassembly is configured to convert a movement which is output from the output side of the steering gear into a rotational movement of at least one wheel of the motor vehicle about a steering axle; and
an absorption unit of the power steering assembly, the absorption unit being configured to at least partially absorb shocks which are received via the wheel of the motor vehicle from a road, wherein
the output side of the steering gear is at least partially formed by an output shaft and the absorption unit is at least partially integrated in the output shaft,
wherein the absorption unit is at least partially formed by a torsion spring which is arranged between an inner portion and an output portion of the output shaft, such that the torsion spring connects the inner portion and the output portion of the output shaft to each other in a positive-locking and/or non-positive-locking manner, and
wherein a rotational movement of the inner portion of the output shaft is transmitted via the torsion spring to the output portion of the output shaft and vice versa.

2. The power steering subassembly as claimed in claim 1, further comprising:
a thrust rod to receive the movement which is output from the output side of the steering gear and to carry out a translational thrust rod movement, wherein
the thrust rod is arranged such that the translational thrust rod movement brings about the rotational movement of the at least one wheel of the motor vehicle about the steering axle.

3. The power steering subassembly as claimed in claim 2, wherein
the absorption unit is at least partially integrated in the thrust rod.

4. The power steering subassembly as claimed in claim 2, further comprising:
a steering lever which adjoins the output side of the steering gear, and
wherein the absorption unit is at least partially integrated in a transition from the steering lever to an adjacent ball joint.

5. The power steering subassembly as claimed in claim 4, wherein
the absorption unit which is integrated in the transition from the steering lever to the adjacent ball joint is formed by a resilient element, and
wherein the resilient element is arranged at an end, facing the ball joint, of the steering lever in such a manner that the resilient element forms an at least positive-locking connection with respect to the ball joint.

6. The power steering subassembly as claimed in claim 5, wherein
the resilient element is arranged at the end, facing the thrust rod, of the steering lever in a front, central receiving member, with respect to a steering lever axis, of the steering lever and so as to externally surround a connection piece of the ball joint which connects the steering lever to the thrust rod.

7. The power steering subassembly as claimed in claim 1, further comprising:
at least one ball joint arranged adjacent to the output side of the steering gear in order to transmit the movement which is output from the output side of the steering gear, and wherein
the absorption unit is at least partially integrated in the ball joint.

8. The power steering subassembly as claimed in claim 1, wherein the absorption unit is at least partially integrated in a fixing arrangement in order to fix the steering gear to a frame of the motor vehicle.

9. The power steering subassembly as claimed in claim 8, further comprising:
a spacer sleeve,
wherein the spacer sleeve is arranged between an assembly side of the steering gear and the longitudinal beam of the frame of the motor vehicle,
wherein a resilient element which forms the absorption unit which is integrated in the fixing arrangement externally surrounds the spacer sleeve, and
wherein the spacer sleeve externally surrounds a shaft of the fixing screw.

10. The power steering subassembly as claimed in claim 1, wherein
the steering gear has an input shaft in the form of a spindle and a recirculating ball nut in order to convert the rotational movement of the input shaft into a translational movement,
wherein a tooth arrangement portion is provided so as to externally surround the recirculating ball nut, and
wherein the absorption unit is arranged in such a manner that the translational movement of the recirculating ball nut is transmitted via the absorption unit to the tooth arrangement portion and vice versa.

11. The power steering subassembly as claimed in claim 1, wherein
the steering gear is in the form of a recirculating ball steering system and the absorption unit is at least partially integrated in a hydraulic unit of the recirculating ball steering system,
wherein the hydraulic unit of the recirculating ball steering system has two oil chambers, which are arranged at opposite sides of a piston and which are separated from each other, for hydraulic steering support, and
wherein the absorption unit which is integrated in the hydraulic unit of the recirculating ball steering system is formed by a compensation element, which connects the two oil chambers to each other.

12. The power steering subassembly as claimed in claim 1, wherein
the steering gear has an input shaft in the form of a spindle and a recirculating ball nut for converting the rotational movement of the input shaft into a translational movement, and
the absorption unit is at least partially formed as an axial resilient spindle bearing of the input shaft.

13. The power steering subassembly as claimed in claim 12, wherein
the absorption unit which is formed as an axial resilient spindle bearing of the input shaft is formed by at least one resilient element, and
the at least one resilient element is arranged in a manner adjoining a bearing arrangement of the input shaft for rotatably supporting the input shaft in a housing such that the bearing arrangement of the input shaft is received in the housing in an axially resilient manner via the at least one resilient element.

14. The power steering subassembly as claimed in claim 10, wherein
the input shaft, which is in the form of a spindle, is constructed in several pieces by at least one spindle portion, which faces the recirculating ball nut, and an input portion, and
the spindle portion and the input portion are connected to each other in a rotationally secure but axially resilient manner via the absorption unit, which is in the form of an axial, resilient spindle bearing of the input shaft.

15. The power steering subassembly as claimed in claim 14, wherein
the axial, resilient spindle bearing of the input shaft is in the form of annular springs.

* * * * *